US009475371B2

(12) United States Patent
LaBiche

(10) Patent No.: US 9,475,371 B2
(45) Date of Patent: Oct. 25, 2016

(54) CARGO AREA CONVERSION ASSEMBLY, SYSTEM AND METHOD

(71) Applicant: Mitchell Glenn LaBiche, Friendswood, TX (US)

(72) Inventor: Mitchell Glenn LaBiche, Friendswood, TX (US)

( * ) Notice: Subject to any disclaimer, the term of this patent is extended or adjusted under 35 U.S.C. 154(b) by 31 days.

(21) Appl. No.: 14/684,244

(22) Filed: Apr. 10, 2015

(65) Prior Publication Data

US 2015/0291017 A1 Oct. 15, 2015

Related U.S. Application Data

(60) Provisional application No. 61/977,899, filed on Apr. 10, 2014.

(51) Int. Cl.
*B60P 7/02* (2006.01)
*B60J 7/14* (2006.01)
*B60J 7/12* (2006.01)

(52) U.S. Cl.
CPC ............... *B60J 7/141* (2013.01); *B60J 7/1204* (2013.01); *B60P 7/02* (2013.01)

(58) Field of Classification Search
CPC ........... B60J 7/141; B60J 7/1204; B60P 7/02
See application file for complete search history.

(56) References Cited

U.S. PATENT DOCUMENTS

| | | |
|---|---|---|
| 3,367,347 A | 2/1968 | Smith |
| 4,815,786 A | 3/1989 | McRay |
| 4,848,830 A | 7/1989 | Parson |
| 4,875,731 A | 10/1989 | Ruiz |
| 5,299,849 A | 4/1994 | Cook et al. |
| 5,735,565 A | 4/1998 | Papai et al. |
| 5,752,736 A | 5/1998 | Nodier |
| 5,988,195 A | 11/1999 | Kaestner et al. |
| 6,435,594 B1 | 8/2002 | Ekonen et al. |
| 6,481,784 B2 | 11/2002 | Cargill |
| 6,663,160 B2 | 12/2003 | Yarbrough et al. |
| 6,739,617 B1 | 5/2004 | Martin |
| 6,820,915 B2 | 11/2004 | Mack et al. |
| 6,902,222 B2 | 6/2005 | Nykiel et al. |
| 6,942,275 B2 | 9/2005 | Corbett |
| 7,207,614 B2 | 4/2007 | Briggs |
| 7,243,965 B2 | 7/2007 | King et al. |
| 7,404,590 B2 | 7/2008 | Loranger |
| 8,764,094 B1 | 7/2014 | Castillo |
| 8,794,690 B1 | 8/2014 | Al-Saeed |
| 2002/0008406 A1 | 1/2002 | Phillips et al. |
| 2008/0174142 A1 | 7/2008 | Pearlman |
| 2010/0194137 A1 | 8/2010 | Kealy |
| 2011/0095559 A1 | 4/2011 | Edens |
| 2013/0175818 A1 | 7/2013 | Bates |

*Primary Examiner* — Lori L Lyjak

(74) *Attorney, Agent, or Firm* — Buche & Associates, P.C.; John K. Buche; Scott D. Compton

(57) ABSTRACT

A cargo area conversion assembly, system and method for converting a cargo area, e.g., a cargo area of a trailer or a pickup truck, between an open bed position, a bed cover position and a camper top position. Conversion between the three positions may be manually accomplished or mechanically/electronically accomplished.

9 Claims, 22 Drawing Sheets

CARGO AREA CONVERSION ASSEMBLY, SYSTEM AND METHOD

CROSS-REFERENCE TO RELATED APPLICATIONS

This application claims the benefit of U.S. Provisional Application Ser. No. 61/977,899 filed Apr. 10, 2014, the content of which is hereby incorporated by reference.

STATEMENT REGARDING FEDERALLY SPONSORED RESEARCH OR DEVELOPMENT

Not applicable.

FIELD OF THE APPLICATION

This application relates generally to a multi-purpose cargo area conversion system.

BACKGROUND

Multi-purpose cargo area devices such as truck bed devices providing shelter and/or storage are known. A durable, rapid acting conversion system for a conventional pickup truck effective as a bed liner, bed cover and camper top is desired.

SUMMARY

The present application is directed to a cargo area conversion assembly including a plurality of planar members foldably attached together and to the walls of a cargo area, the planar members being operationally configured to act as the floor and side walls of the cargo area in a first position, act as a horizontal cover of the cargo area in a second position, and act as the roof and perimeter side walls of a camper top above the side walls of the cargo area in a third position.

The present application is also directed to a conversion system for a truck bed including (A) a plurality of planar members foldably attached together and to the bed of the truck, including a first planar member operationally configured to operate as a truck bed surface in a first position, a truck bed cover in a second position, and as a camper top roof in a third position; (B) an actuation system operationally configured to direct the first planar member between the first, second and third positions; and (C) an automatic control system in electrical communication with the actuation system, the automatic control system being operationally configured to direct the system between the first, second and third positions.

The present application is also directed to a method of converting an open bed cargo area to a cargo area that is convertible between an open bed setting and a camper top setting, including installing in the open bed cargo area (A) a cargo area conversion system including (1) a plurality of planar members foldably attached together and operationally configured to be attached to the walls of a cargo area, the planar members being operationally configured to act as the floor and side walls of the cargo area in a first position, act as a horizontal cover of the cargo area in a second position, and act as the roof and perimeter side walls of a camper top above the side walls of the cargo area in a third position; (B) an actuation system in communication with the cargo area and the cargo area conversion system; and (C) an automatic control system in electrical communication with the actuation system.

DETAILED DESCRIPTION OF THE INVENTION

Figure 1:
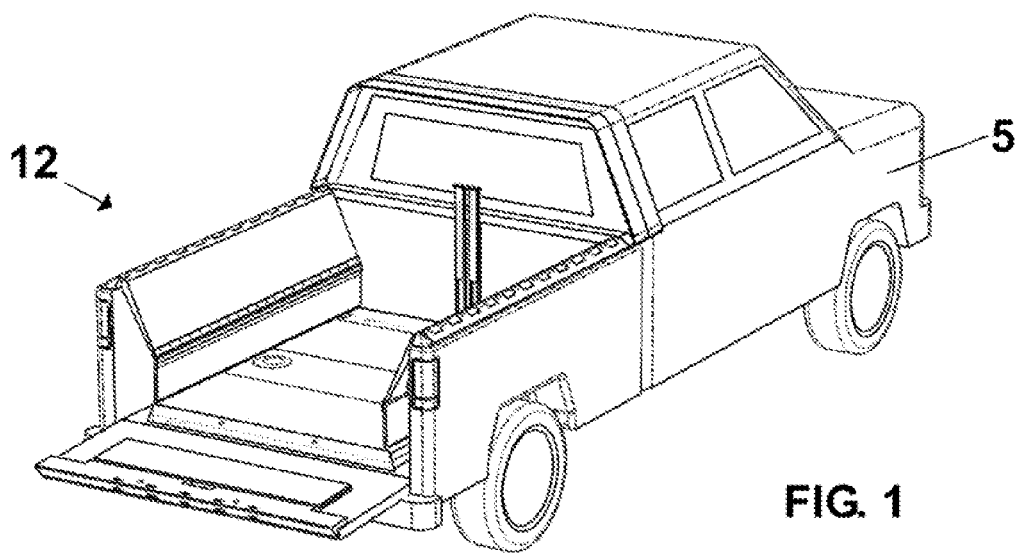
FIG. 1 is a simplified illustration of an embodiment of an installed conversion system providing an open bed truck.

Before describing the invention in detail, it is to be understood that the present assembly, system and method are not limited to particular embodiments. It is also to be understood that the terminology used herein is for the purpose of describing particular embodiments only, and is not intended to be limiting. As used in this specification and the appended claims, the term cargo area may include the open cargo area of a truck, trailer, and the like. The term "truck" herein refers to a motor land vehicle with an open rear cargo enclosure often referred to as a "pickup truck," "pickup" or "pick-up." As understood by persons of ordinary skill in the art of trucks, the rear cargo enclosure is often referred to as the "bed" or "load bed" of the truck. As also understood by the skilled artisan, in the United States the term "pickup truck" is used for vehicles in three classes of "light duty truck," which is smaller than medium trucks defined as weighing between 6350.8 kg-7257.5 kg (14001-16000 pounds). As understood by the skilled artisan, the Class 1 truck gross vehicle weight rating ("GVWR") ranges from 0.00-2722 kg, (0.00-6000 pounds). Examples of Class 1 trucks include the Toyota Tacoma®, Dodge Dakota® and the GMC Canyon®. Class 2 trucks have a GVWR ranging from 2722-4536 kg (6001-10000 pounds). Examples of Class 2 trucks include the Dodge Ram® 2500, Chevrolet Silverado® 2500 and the Ford F-250®. Class 3 trucks have a GVWR ranging from 4536-6350 kg (10001-14000 pounds). Examples of Class 3 vehicles include the Dodge Ram® 3500, Ford F-350® and the GMC Sierra® 3500.

Generally, the application provides an assembly of component parts for converting a truck between (1) an open rear cargo, i.e., an "open bed truck," (2) a covered rear cargo, i.e., a truck characterized by a "bed cover," and (3) a camper type top or raised top covering the truck bed. For simplicity, the three variations of truck discussed herein may be referred to as open bed trucks, bed cover trucks and camper top trucks—collectively referred to as "truck styles" or "styles of trucks." Suitably, one or more of the component parts are operationally configured to seal the bed of a cargo area such as a trailer or truck during use, e.g., sealing members—forming seals between the component parts themselves and seals between the component parts and the perimeter of the cargo area.

In one aspect, the application provides a system for powered automatic conversion between three truck styles. Power may include electric power and/or hydraulic power and/or pneumatic power. The system may also include one or more storage areas for tools, food/beverage, hobby and/or recreation articles.

In another aspect, the application provides a conversion system effective for trucks of varying bed dimensions.

In another aspect, the application provides a conversion system operationally configured to provide a fluid seal along the perimeter of a cargo bed's side walls.

In another aspect, the application provides a conversion system including one or more component parts decorated and/or coated with ultra-violet ("UV") inks and/or coatings.

In another aspect, the application provides an assembly of component parts that may be provided as an after-market product to be installed to a pre-existing truck or the component parts may be installed at the time of truck manufacture.

Figure 2:
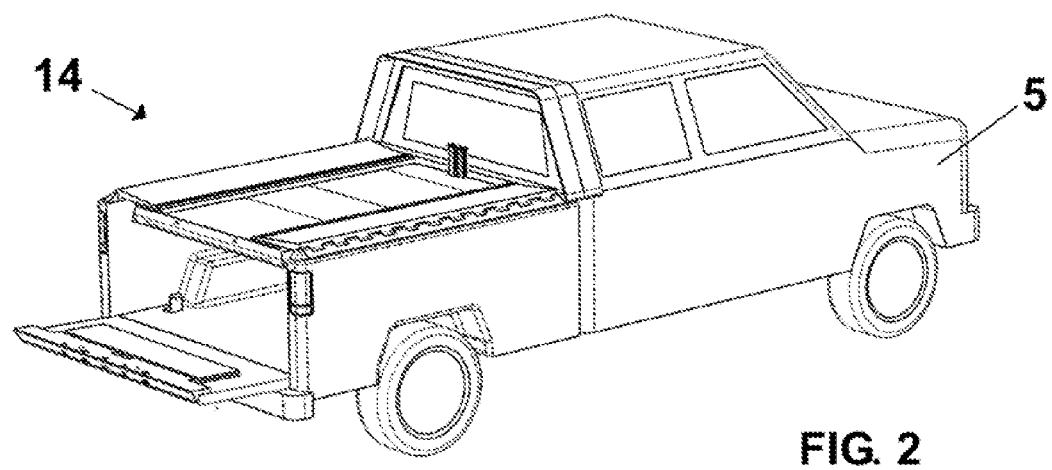
FIG. 2 is a simplified illustration of the conversion system of FIG. 1 providing a bed cover for the truck.
Figure 3:
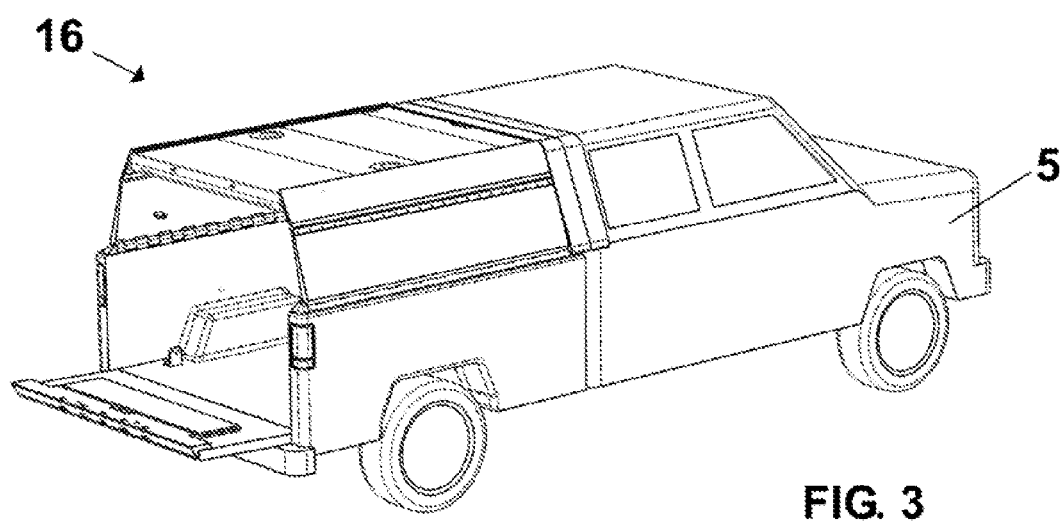
FIG. 3 is a simplified illustration of the conversion system of FIG. 1 providing a camper top or raised top for the truck.

With reference now to FIGS. 1-3, a simplified illustration of a embodiment of the present conversion system ("system 10") is provided showing an assembly of various component parts in three different operable settings or positions providing the various truck 5 styles. In simplest terms, the present system 10 is operationally configured to provide at least the following settings: (1) an open bed 12 setting as shown in FIG. 1, (2) a bed cover 14 setting as shown in FIGS. 2 and (3) a camper top or raised top 16 setting as shown in FIG. 3.

Generally, the system 10 includes various component parts in the form of planar type members attached together in a manner effective to fold and unfold between (1) an open bed 12 whereby the planar type members are in a first folded position and substantially conform to the shape of the truck bed (FIG. 1) and (2) a raised top 16 whereby the planar type members are in an unfolded, fully extended position (FIG. 3). In other words, the planar members are operationally configured to be arranged whereby the outer surface of the panels are effective for use as a truck bed and the inner surface of the panels are effective for use as a camper top walls and roof. In one embodiment, the various planar type members may be hingedly attached together. In another embodiment, the various planar type members may be provided as a single component with folding lines or seams disposed between the individual planar type members. In another embodiment, one or more perforated seams may be employed. Although each of the planar type members discussed herein generally have planar type shapes, one or more of such members may include tapered surfaces, concave surfaces, convex surfaces, rounded corners and one or more surfaces features without detracting from the purpose and function of the system 10.

Figure 4:
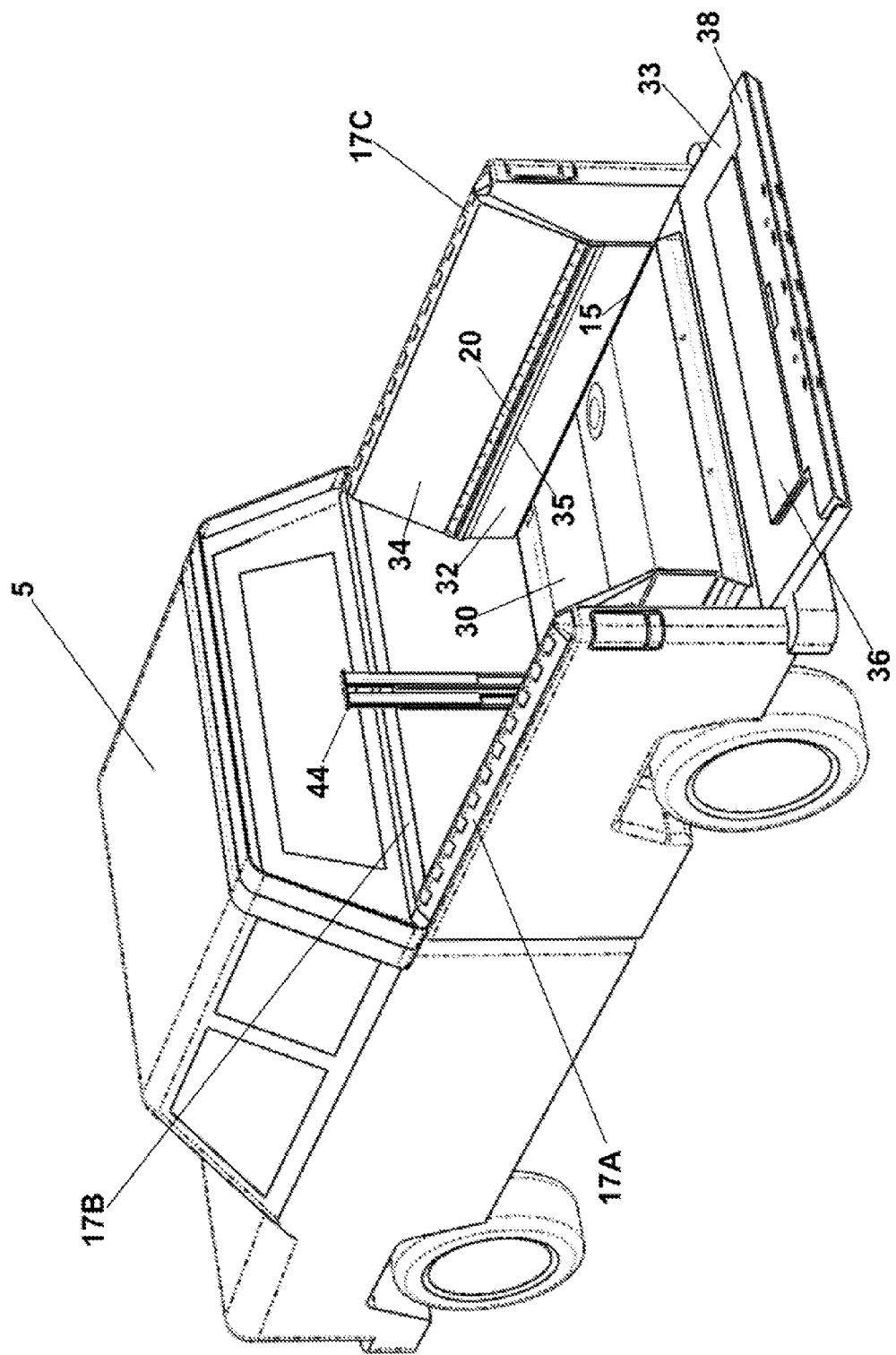
FIG. 4 is a simplified illustration of an embodiment of an installed conversion system in an open bed position.

Turning to FIG. 4, in one suitable embodiment the system 10 may include truck bed rail attachments 17A-17C operationally configured to attach the system 10 along the top edge of a truck 5 bed side walls in a manner effective to support the moving panel members of the system 10 during conversion and when the panels are set to one of the three fixed truck styles. In one embodiment, the rail attachments 17A-17C may be attached to the truck bed via one or more fasteners, e.g., one or more screws and the like. In another embodiment, the rail attachments 17A-17C may be operationally configured to form fit the top edge of truck bed side walls, e.g., a snap-on fit. Suitably, the rail attachments 17A-17C are constructed from one or more durable materials including, but not necessarily limited to plastics, metals, and combinations thereof. In one particular embodiment, the rail attachments 17A-17C may be constructed from Acrylonitrile butadiene styrene ("ABS"). In another particular embodiment, the rail attachments 17A-17C may be constructed from aluminum.

As shown in FIG. 4, a plurality of planar structural members are hingedly attached to the rail attachments 17A-17C for folding in a manner effective to form an open bed surface whereby the planar members form an inner surface substantially similar as the inner surface of the truck bed, i.e., the bed bottom and the side walls of the truck bed. In this particular embodiment, the system 10 includes a first planar member 30 hingedly attached to side rail attachments 17A, 17C via a combination of opposing inner panels 32 and outer panels 34. As shown, the first planar member 30 is hingedly attached to opposing inner panels 32 along its right and left side edges (see hinge 15). The outer edges of the inner panels 32 are hingedly attached to the inner edges of the outer panels 34 (see hinge 20). The outer edges of the outer panels 34 are hingedly attached to the side rail attachments 17A and 17C.

In operation, the planar members 30, 32 and 34 fold and unfold as shown in FIGS. 22A-22L. In an open bed 12 position (FIG. 22A), the outer surface of the planar members 30, 32, 34 lie on differing planes—the plane of the first planar member 30 being in a substantially horizontal orientation and the planes of the opposing inner panels 32 being in a substantially parallel relationship. In a bed cover 14 position (FIG. 22E), the outer surface of the first planar member 30 and the inner panels 32 lie on substantially parallel horizontal planes and the outer surface of the outer panels 34 lie on planes distinct from one another as well as the first planar member 30 and the inner panels 32. In a camper top 16 position (FIG. 22L), the first planar member 30 includes an outer surface defined by a substantially horizontal plane, the outer surface of the inner and outer panels 32, 34 attached at the right side of the first planar member 30 defining a first non-horizontal plane and the outer surface of the inner and outer panels 32, 34 attached at the left side of the first planar member 30 defining a second non-horizontal plane.

Suitably, the first planar member 30 is operationally configured to act as a truck bed bottom surface, a bed cover and as an upper surface or roof of the camper top setting of the system 10. The inner panels 32 and the outer panels 34 are operationally configured to act as truck bed side walls, part of the bed cover in combination with the first planar member 30 (see FIG. 2) and as camper top side walls as shown in FIG. 3. The outer panels 34 may also include a liquid seal member 35 (see FIG. 4) disposed along the length of the inner edges of the outer panels 34 operationally configured to overlap the adjacent hinge and provide a seal between the outer panels and the outer surface of the first planar member 30. In addition, the outer surface of the first planar member 30 may include one or more attachments for securing cargo to be held atop the first planar member, e.g., when a user is driving a truck 5 with the system 10 in a camper top 16 position. As understood by the skilled artisan, the outer surface of the first planar member 30 may be provided with one or more sunken hooks and/or surface rings for tying down cargo thereon and/or for adding a roof rack as commercially available in the automobile industry.

Suitably, the first planar member 30 is constructed from one or more materials suitable for both normal and extraordinary loading conditions resulting from temperature changes, compression loads, tension loads, impact, shock, shear loads, torsion loads and/or any other distorting loading tendency. Without limiting the first planar member 30 to one or more particular materials of construction, one suitable first planar member 30 may be constructed from metal, plastic, composite material, and combinations thereof durable for withstanding extended use as a truck bed for loading and hauling freight type items, construction supplies including lumber, bricks, concrete, and variations of earth, e.g., sand, stone, dirt. While durability is important it is also desirable to ensure that the first planar member 30 is not too heavy so to minimize the load required for actuation of the first planar member 30 from an open bed position to a bed cover position and/or camper top position. A suitable metal may include aluminum, steel, titanium, and combinations thereof. In one particular embodiment, the first planar member 30 may be constructed from aluminum sheet material. In another embodiment, the first planar member 30 may be constructed from aluminum sheet material including a reinforcing uppermost layer constructed from one or more metals, e.g., steel. In one embodiment, an uppermost reinforcing layer may be provided as permanently attached. In another embodiment, the uppermost reinforcing layer may be removably attached via one or more fasteners, e.g., countersunk screws. Removability of the uppermost layer allows for replacement of the same when damaged or replaced for aesthetic purposes. One particular metal uppermost layer includes a diamond steel plate material. A suitable plastic may include one or more high impact polymers including, but not necessarily limited to high impact polypropylene.

Figure 5:
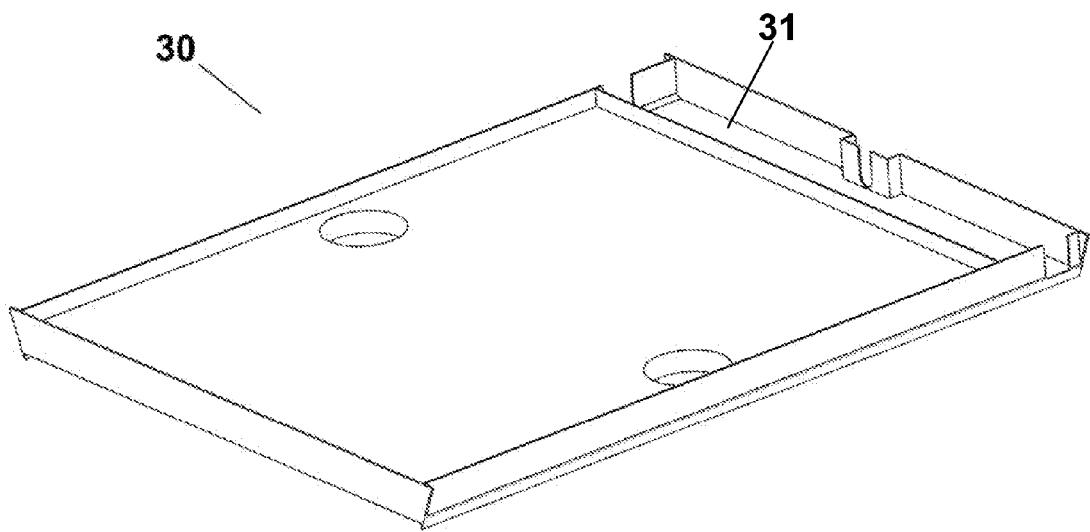
FIG. 5 is a simplified illustration of the underside of the first planar member.
Figure 6:
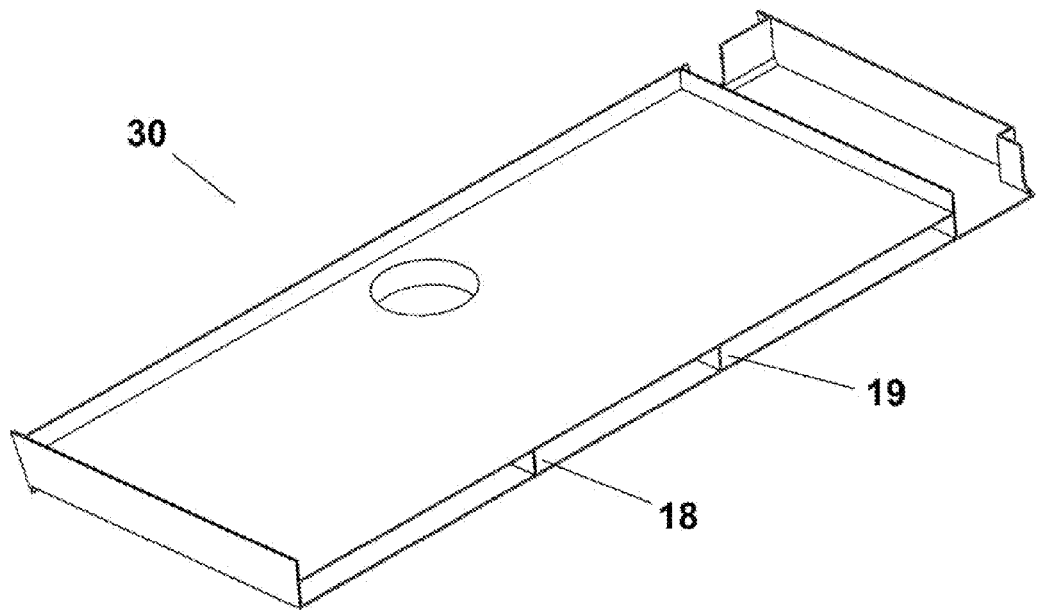
FIG. 6 is a sectional view of the first planar member of FIG. 5.

FIGS. 5-6 illustrate one particular embodiment a first planar member 30 constructed of aluminum sheet metal to form a hollow box configuration with reinforcing rib members 18, 19 disposed across the inner width of the box at one-third ($\frac{1}{3}$) and two-thirds ($\frac{2}{3}$) of the first planar member 30. In this particular embodiment, the first planar member 30 has an overall height of about 8.89 cm (about 3.5 inches). The hollow box section is about 5.08 cm (about 2.0 inches tall) and the lowermost three-fourths of the hollow box is operationally configured to provide space to store and hide away the fold down windows and/or air bag lift assists described in more detail below. The ribbed hollow box provides a rigid or stiff body effective for maintaining the first planar member 30 in a substantially horizontal position during operation. As shown, the first surface of the first planar member 30 may include a designated space 31 for housing an actuator, as discussed below, when the system is set to an open bed 12 position. In another embodiment, the first planar member 30 may be filled with foam, which may suppress or otherwise deaden sound. In another embodiment, the first planar member 30 may include a honeycomb matrix therein for added structural strength. In this embodiment, the first planar member 30 may be provided without rib members 18, 19 as desired.

In addition, the outer surface of the first planar member 30 may have one or more particular surface features as desired. For example, the outer surface of the first planar member 30 may have one or more raised surface patterns or anti-slip patterns. It is also contemplated that the first planar member 30 may include a spray-on protective coating as understood by skilled artisans in the art of truck bed liners.

Without limiting the inner panels 32 to one or more particular materials of construction, suitable materials may include, but are not necessarily limited to metals, plastics, composite materials, and combinations thereof. The outer panels 34 may also be constructed from metals, plastics, composite materials, and combinations thereof. Similar as the first planar member 30, the inner panels 32 and/or the outer panels 34 may include additional outer layers for protecting the panels and adding ruggedness, durability and torsion strength. Like the first planar member 30, the weight of the panels 32, 34 may be a consideration and it may be desired to use materials of construction suitable to minimize the load required for actuation of the system 10.

Figure 20:
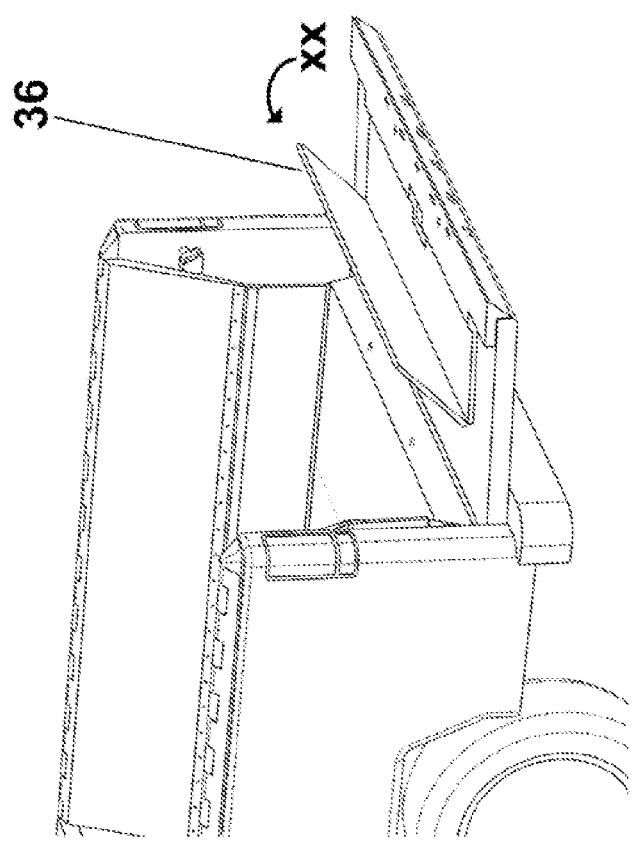
FIG. 20 is a simplified illustration of an integrated folding panel of the present application.
Figure 22A:
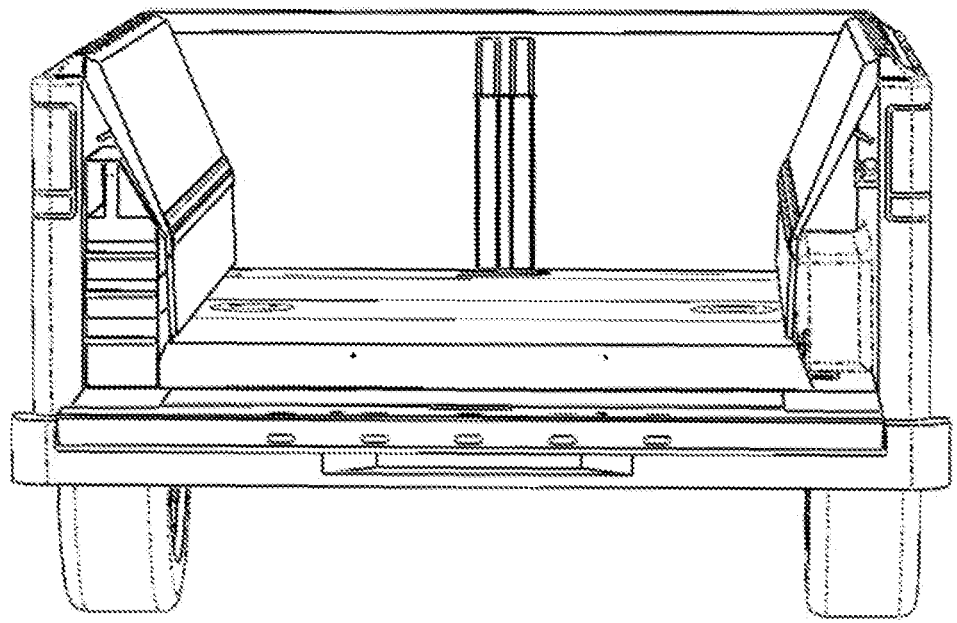
FIG. 22A is a simplified illustration of an embodiment of the conversion system in an open bed position.
Figure 22B:
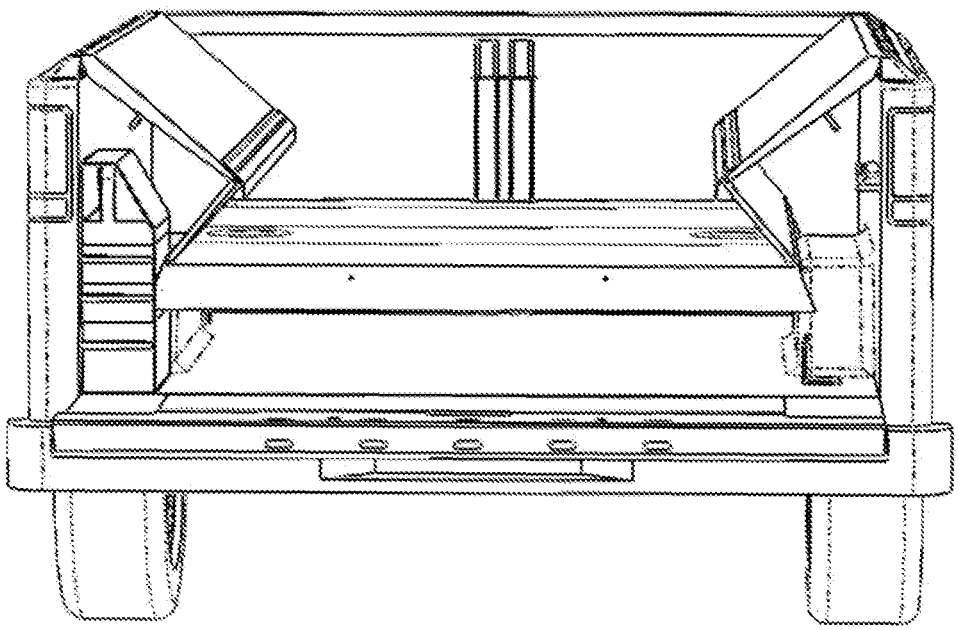
FIG. 22B is a simplified illustration of the conversion system of FIG. 22A converting from an open bed position to a bed cover position.
Figure 22C:
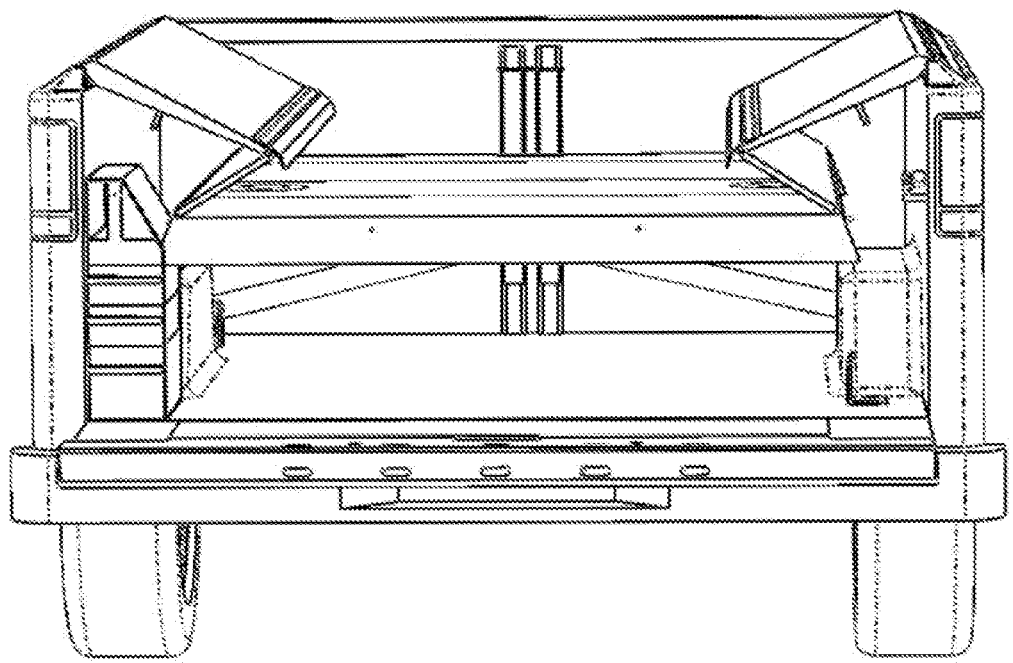
FIG. 22C is a simplified illustration of the conversion system of FIG. 22A-22B converting from an open bed position to a bed cover position.
Figure 22D:
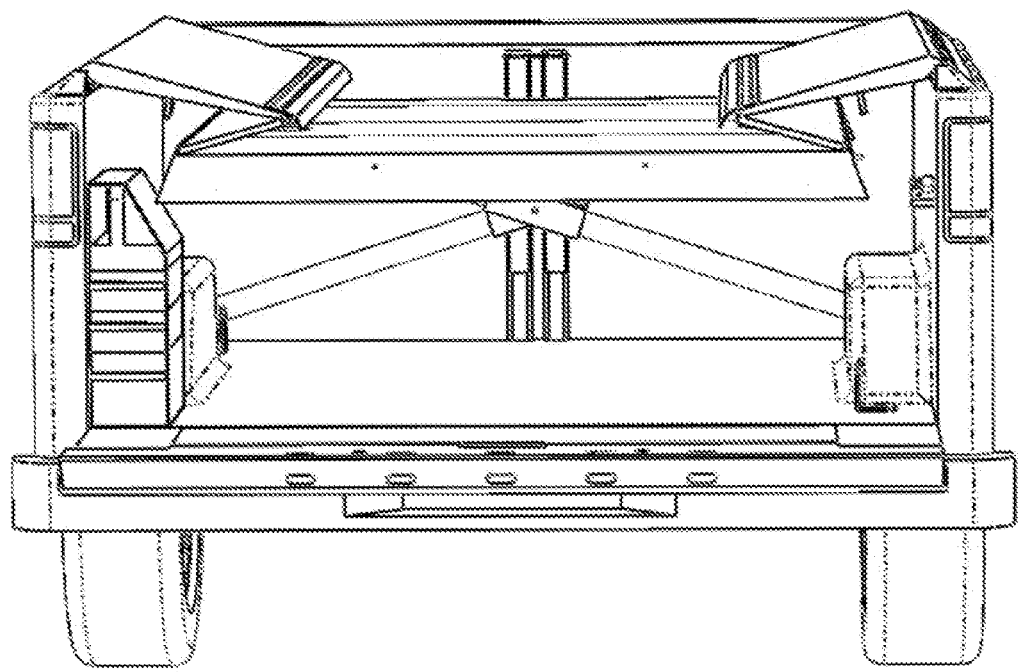
FIG. 22D is a simplified illustration of the conversion system of FIG. 22A-22C converting from an open bed position to a bed cover position.
Figure 22E:
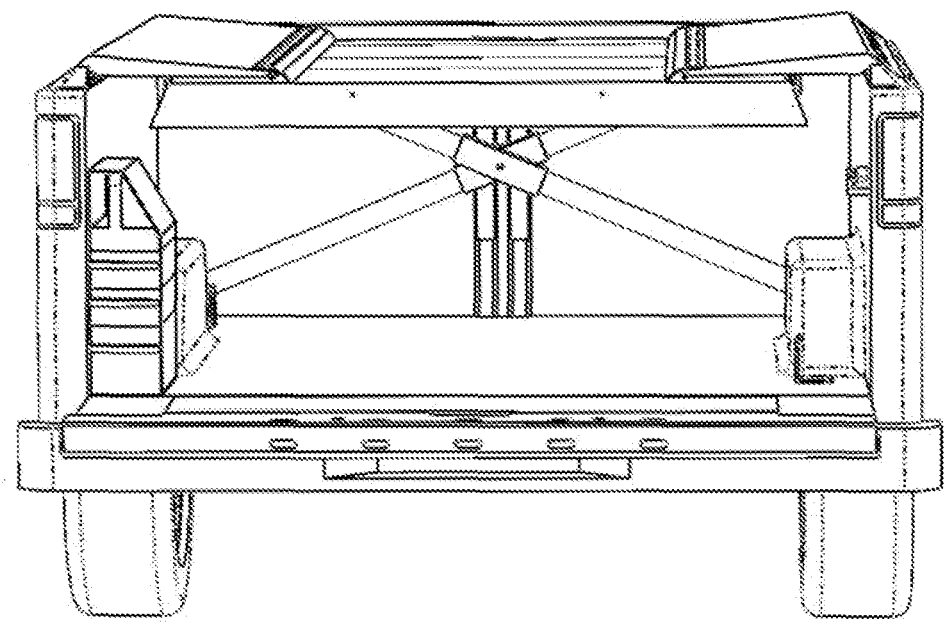
FIG. 22E is a simplified illustration of the conversion system of FIG. 22A-22D in a bed cover position.
Figure 22F:
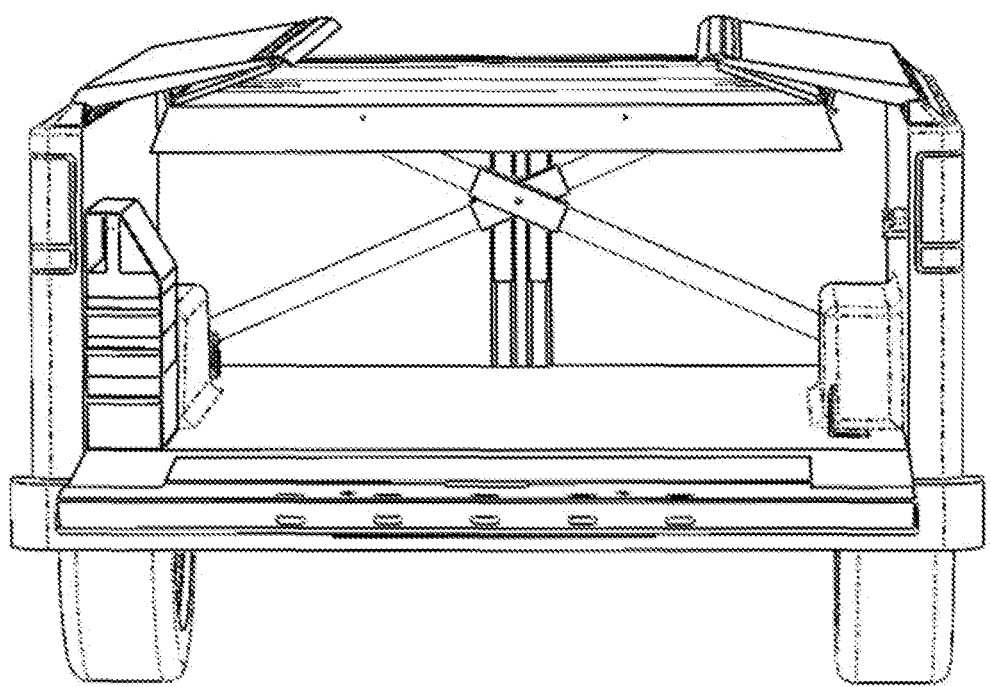
FIG. 22F is a simplified illustration of the conversion system of FIG. 22A-22E converting from a bed cover position to a camper top position.
Figure 22G:
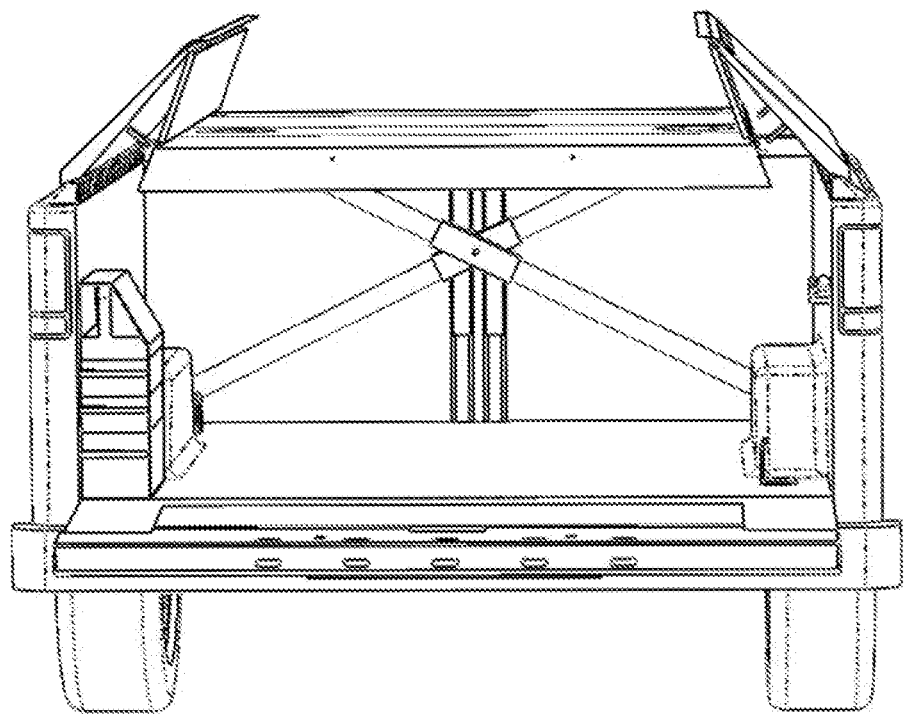
FIG. 22G is a simplified illustration of the conversion system of FIG. 22A-22F converting from a bed cover position to a camper top position.
Figure 22H:
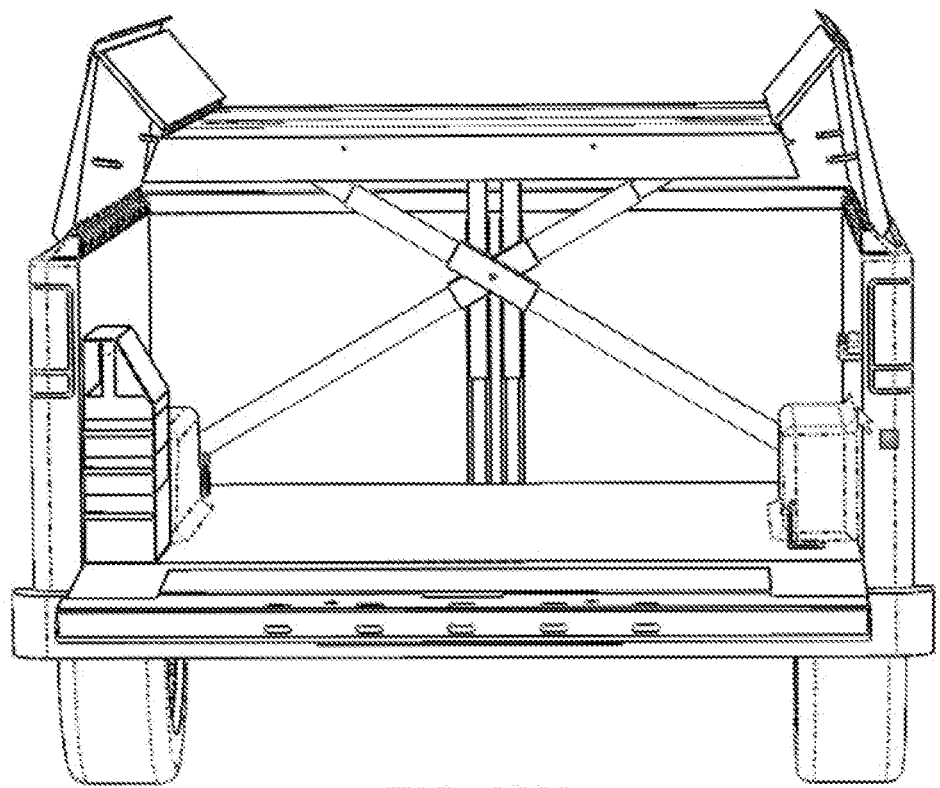
FIG. 22H is a simplified illustration of the conversion system of FIG. 22A-22G converting from a bed cover position to a camper top position.
Figure 22I:
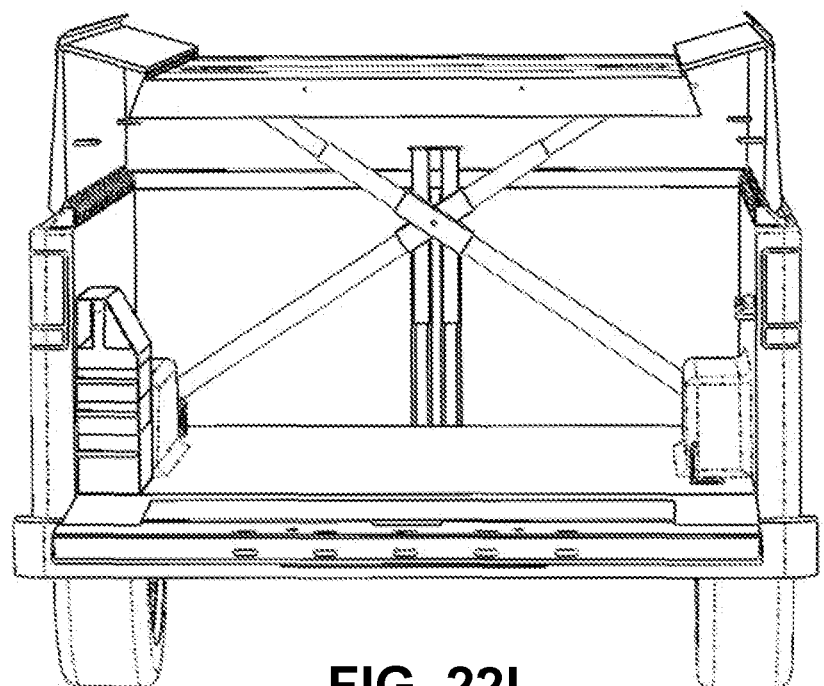
FIG. 22I is a simplified illustration of the conversion system of FIG. 22A-22H converting from a bed cover position to a camper top position.
Figure 22J:
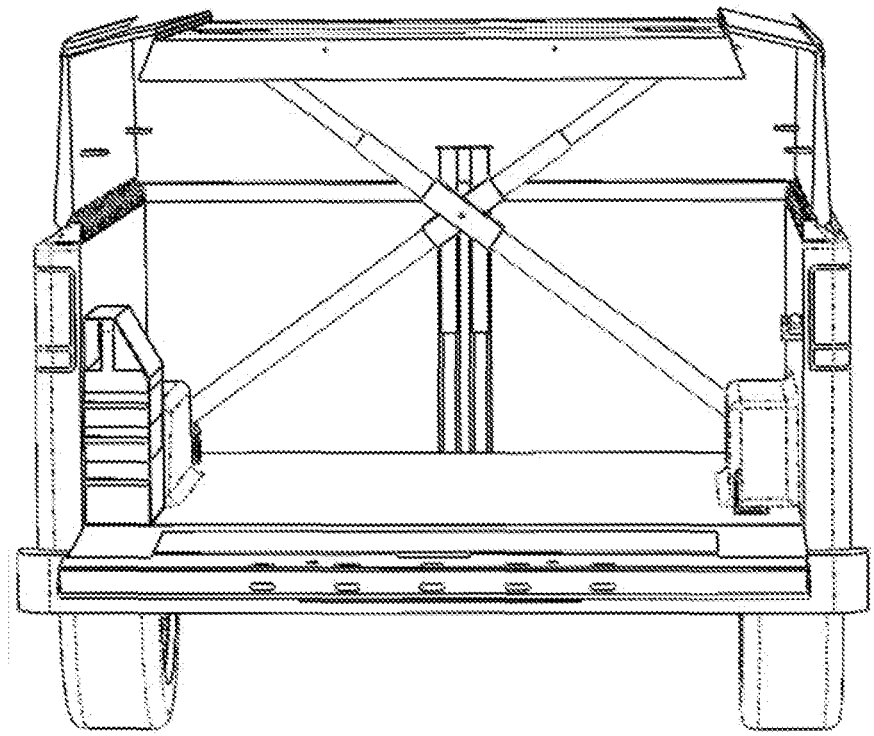
FIG. 22J is a simplified illustration of the conversion system of FIG. 22A-22I converting from a bed cover position to a camper top position.
Figure 22K:
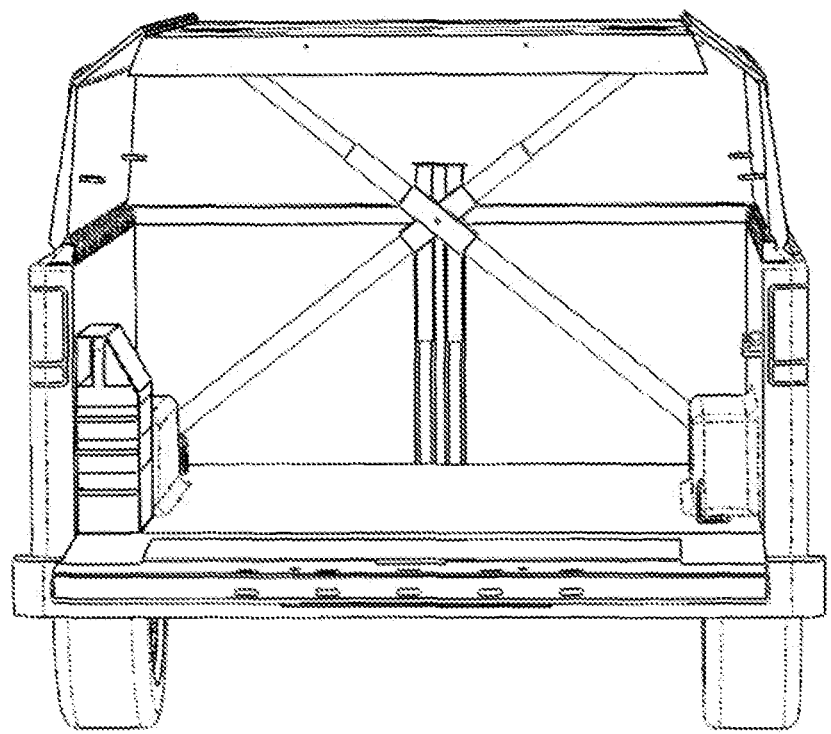
FIG. 22K is a simplified illustration of the conversion system of FIG. 22A-22J converting from a bed cover position to a camper top position.
Figure 22L:
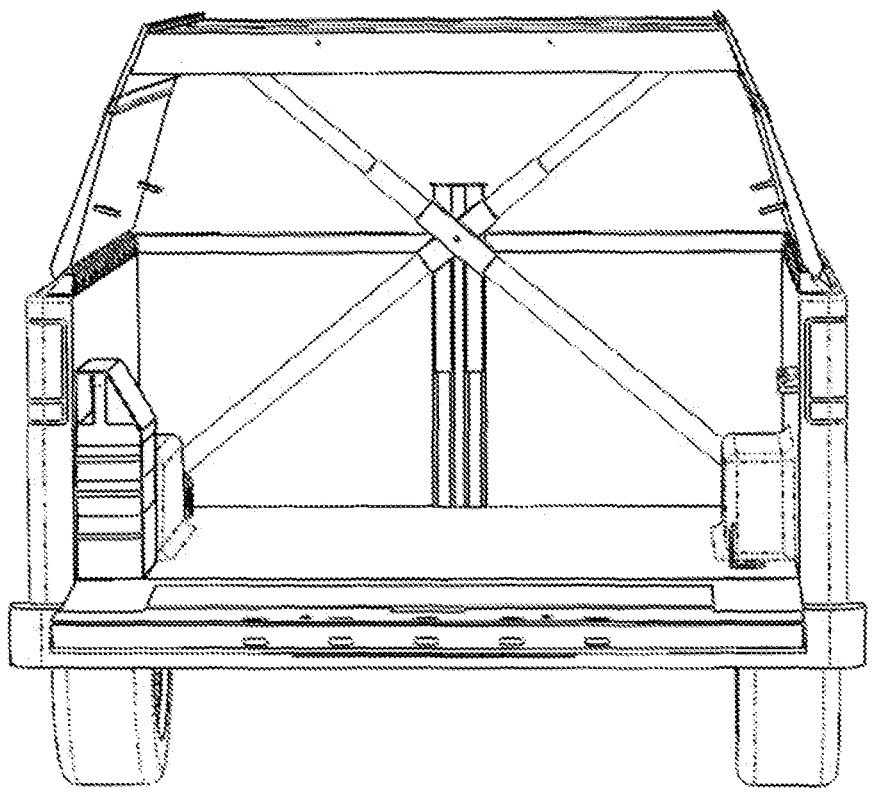
FIG. 22L is a simplified illustration of the conversion system of FIG. 22A-22K in a camper top position.

Referring to FIG. 4, the tailgate 33 of a truck 5 may be provided with one or more tailgate panels 36, 38 effective to help seal the interior of the truck bed when the system 10 is set to a bed cover setting 14 and a camper top setting 16. One type of tailgate panel that may be installed onto a tailgate 33 includes a rear panel 38 having a liquid seal upper edge providing a seal along the width of the uppermost edge of the tailgate 33. As shown, the rear panel 38 may include an integrated folding panel 36 hingedly attached thereto and operationally configured to provide a smooth type transition surface 36A between the tailgate and the truck 5 bed when the panel 36 is unfolded (see Arrow XX in FIG. 20). Of note, the necessity of a folding panel 36 and/or the particular size and shape of the folding panel 36 to be employed may depend on the surface design of a particular tailgate 33. As shown, the rear panel 38 may be provided as an elongated L-shape profile member providing seals along the uppermost edge of the tailgate 33 and along the uppermost part of the inner surface of the tailgate 33. The tailgate panel 38 may be secured to a tailgate 33 via one or more fasteners, e.g., countersunk screws. In another embodiment, the tailgate panel 38 may be adhered to a tailgate 33 as desired. In another embodiment, the tailgate 33 may be modified so that the tailgate panel 38 may be snap-fit to the tailgate 33. In another embodiment, the panel 38 may include female connections for receiving spring loaded male type members of a panel 36 therein, the panel 36 pivoting about the axis of the female/male connections. Panels 36 and 38 may be constructed from one or more materials similar as the inner panels 32 and/or the outer panels 34 as described above.

The present assembly of component parts may be manually operated between the three positions 12, 14, 16 as desired. In one embodiment, the component parts may be converted between the three positions 12, 14, 16 by hand by one or more persons. In such embodiment, the first planar member 30 may be supported in a fixed position via one or more brace members including, but not necessarily limited to cross-supports, linear vertical supports, and/or gas struts, and combinations thereof. One or more gas struts may be attached to the bed of the truck in a manner effective to assist users with lifting the first planar member 30 from a bed cover 14 position to a camper top 16 position. In another embodiment, the first planar member 30 may be raised and lowered via a jack, e.g., a manual screw jack or manual worm gear as understood by the skilled artisan for raising/lowering and supporting the first planar member 30 in fixed positions 14 and 16.

Figure 7:
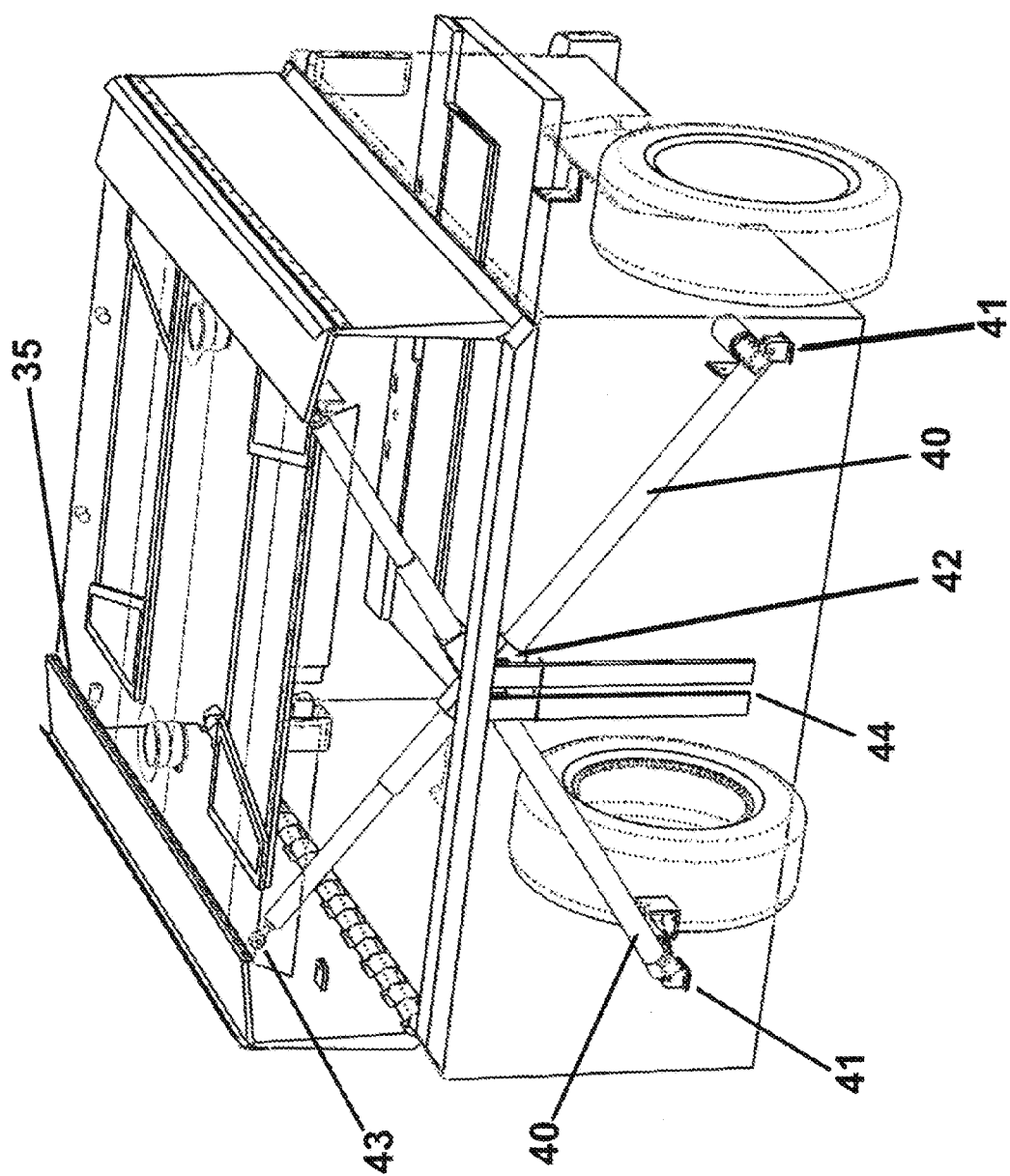
FIG. 7 is a simplified phantom perspective view of a truck bed including a conversion system in a bed cover position.

With reference to FIG. 7, the system 10 may include, in addition or in the alternative, one or more actuator members for raising and lowering the first planar member 30 back and forth through the three positions. In the embodiment of FIG. 7, the actuator member is provided as an actuation system including dual linear actuators 40 intercrossing one in front of the other as shown. Suitably, the linear actuators 40 are pivotally attached to the truck bed via pivot fasteners 41 at a first end and pivotally attached to the first planar member 30 at a second end via pivot fasteners 43. The linear actuators 40 are moveably fixed together for cooperative action at or near their point of intercrossing via a floating guide assembly 42, which includes dual cylinders pivotally attached together, each cylinder corresponding to one of the two linear actuators 40. Herein, such actuation assembly may be referred to as an intercrossing linear actuator assembly whereby each of the opposing linear actuators are directed back and forth in a mirror-like direction relevant the other. Without limiting the invention to a particular mode of operation, one suitable linear actuator is commercially available from Motion, Eatontown, New Jersey, Model 85199/85200—a ball screw linear actuator with a diameter of 0.979 providing a load rating up to 453.6 kg (1000.0 pounds).

As shown, the floating guide assembly 42 is in moveable communication with a centerline guide track 44 allowing the floating guide assembly 42 to be directed along the length of the guide track 44 as the system 10 is converted back and forth between the three truck positions. In operation, the cylinders of the floating guide assembly 42 are pivotally connected in a manner effective for the each cylinder to rotate as the linear actuators 40 extend and retract via linear motion as understood by the skilled artisan. In other words, the cylinders of the floating guide assembly 42 may be directed between (1) a fully retracted position, e.g., open bed position, where the cylinders are situated near the truck bed underneath the first planar member 30 (see space 31) with the central axis of the first cylinder lying substantially parallel with the central axis of the second cylinder and (2) a fully extended position, e.g., camper top position, where the cylinders are situated in a cross pattern. As understood by persons of ordinary skill in the art, the angle between cylinders changes as the linear actuators 40 are extended.

Figure 8A:
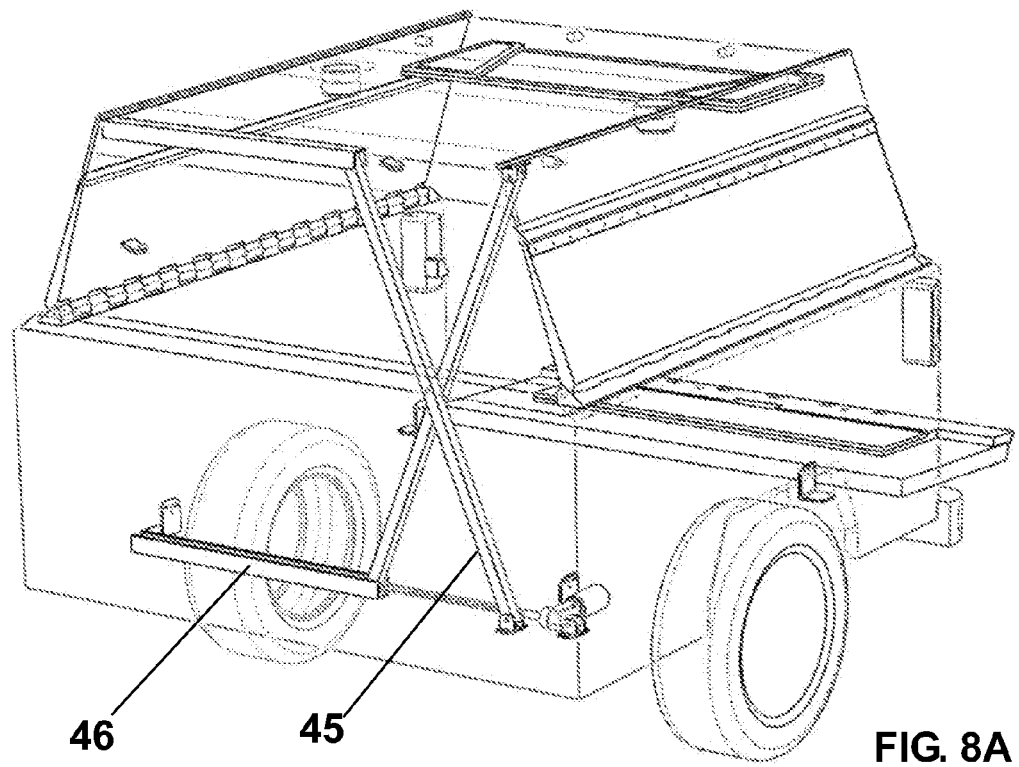
FIG. 8A is a simplified phantom view of an embodiment of a scissor lift of the conversion system.
Figure 8B:
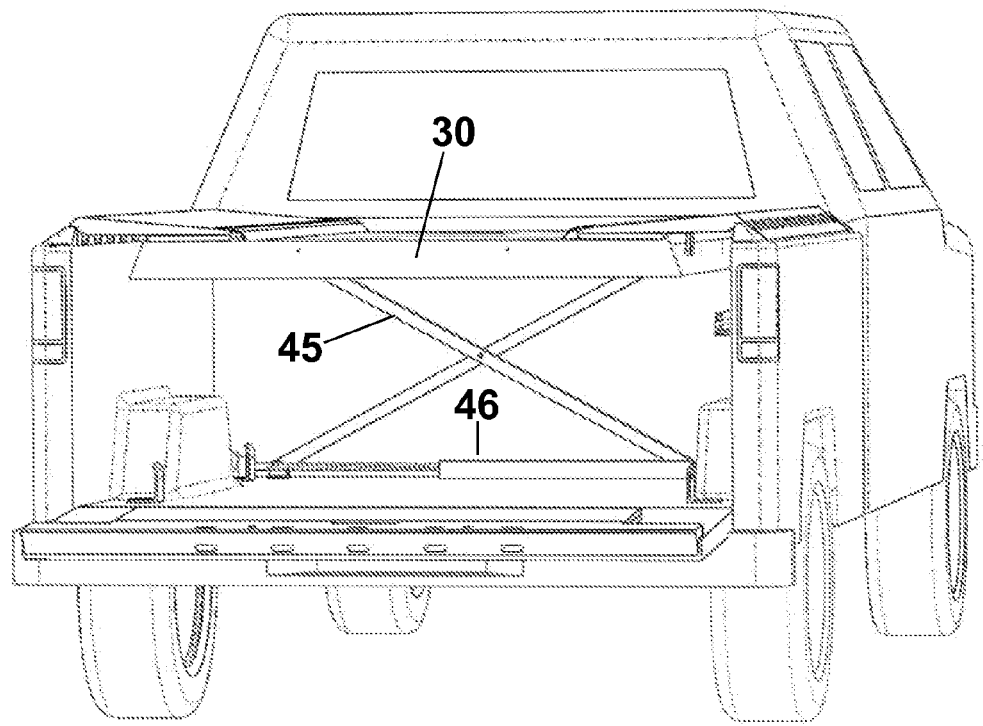
FIG. 8B is another view of an embodiment of a scissor lift of the conversion system.

In another embodiment, the system 10 may employ an actuation system in the form of a scissor lift 45 device near the forward end of the truck bed as shown in the simplified embodiments of FIG. 8A and 8B. Suitably, the scissor lift 45 includes a single scissor lift with straight equal length arms, the arms being pivotally attached as understood by persons of ordinary skill in the art of scissor lifts. In addition, the scissor lift 45 is secured at the base of a truck bed via fasteners as described above including, but not necessarily limited to screws, bolts, and the like. Linear action may be provided via an electromechanical linear actuator 46 or the like of the scissor lift 45, which may be powered by the vehicle's 12-volt electrical system, which is a standard mobile power source as understood by the skilled artisan. In one embodiment, the driving motor of the scissor lift 45 may include a 12-volt motor.

Suitably, the system 10 is operationally configured to support loads up to about 15.0 percent greater than the system 10 requirements, e.g., where the system 10 is activated from an open bed 12 position to either a bed cover 14 position or a camper top 16 position and an undesired load is located upon the first planar member 30. As a measure to prevent undesired loads, the system 10 may include an overload relay to open the system 10 circuitry to prevent system 10 operation until the load is removed. The system 10 may also include a motion detector to prevent system 10 operation if undesired moving objects are detected atop the first planar member 30 when the system is in an open bed 12 position. In addition, the system 10 may also include an object obstruction sensor similar as home garage door sensors to prevent the system 10 from converting from either a camper top 16 position or a bed cover 14 position when one or more objects are detected by such sensor as being located in the bed of a truck 5.

Figure 9:
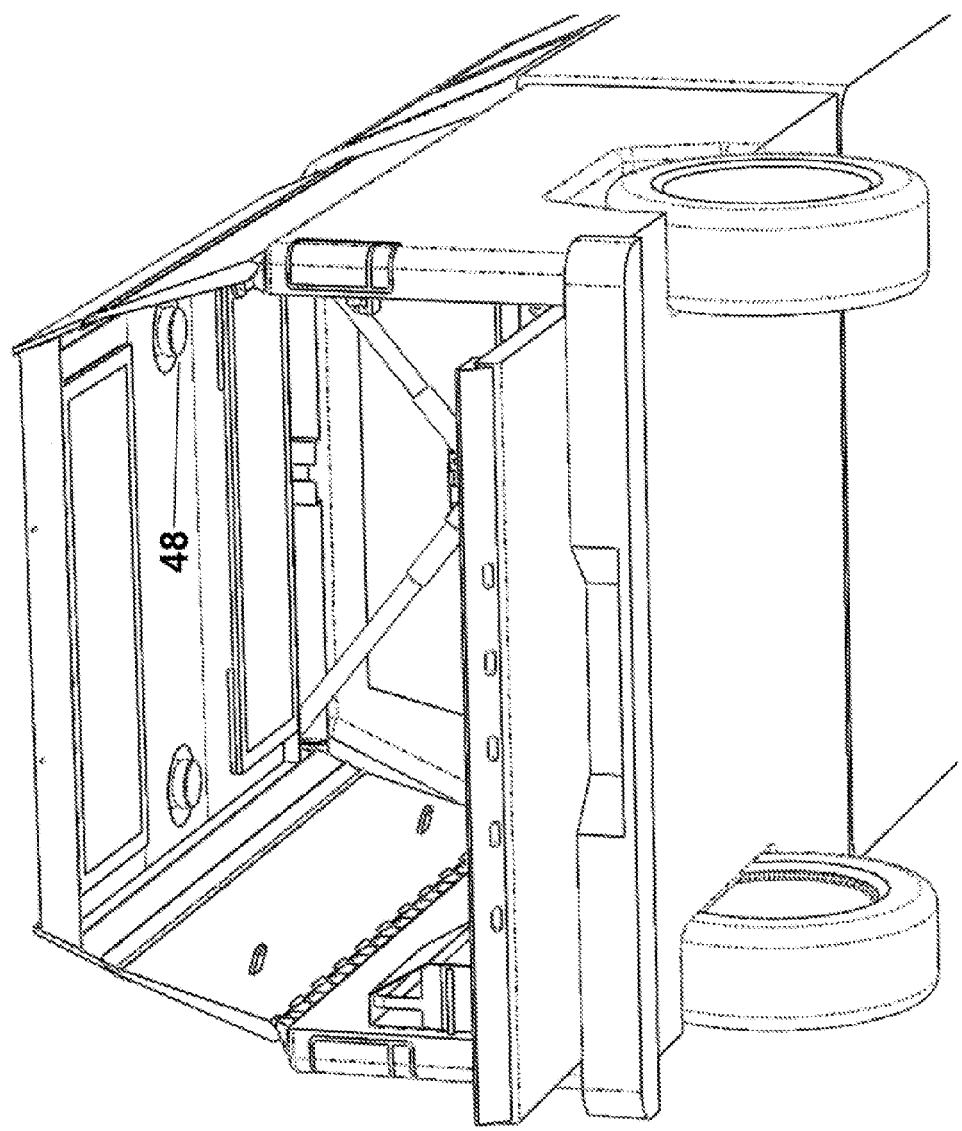
FIG. 9 is a perspective view of the inner surface of a first planar member, inner panels and outer panels with the conversion system in a camper top position.

As depicted in FIG. 9, the system 10 may also include one or more optional air spring lift boosters 48 ("booster") as desired or otherwise required. Likewise, the system 10 may include one or more air compressors in fluid communication with the one or more optional boosters 48, the one or more air compressors being powered by a power source originating from the truck 5. Suitably, boosters 48 are only required to assist in lifting the first planar member 30 through a part of the whole travel distance of the first planar member 30. For example, on a truck 5 of this application this may include a travel distance of up to about the first 15.24 cm (6.0 inches) before the actuator, i.e., an intercrossing linear actuator assembly or scissor lift 45, can develop sufficient angle to achieve a mechanical advantage. For example, where a scissor lift 45 is less than about 7.0 degrees off the bed of the truck 5, one suitable scissor lift 45 is collapsed at about 3.0 degrees and it may not have enough force to lift the first planar member 30, which may weigh up to about 68.01 kg (about 150.00 pounds). At such weight, suitable boosters 48 may include low pressure boosters 48 ranging from 206842.7 Pascal to 344737.9 Pascal (30.0 to 50.0 psi). Suitable commercially available boosters 48 include, but are not necessarily limited to air springs (The Goodyear Tire & Rubber Company, Akron, Ohio; Continental AG, Fort Mill, S.C.); and Airstroke™ Actuators from The Firestone Tire and Rubber Company, Indianapolis, Ind. A suitable air compressor may be installed onto or within the first planar member 30. The air compressor may also be employed for other uses such as airing tires of the truck 5 as necessary.

Once the first planar member 30 is raised to a bed cover position or a camper top position, the booster air pressure may be dumped whereby the one or more booster 48 may be refracted into cavities 49 along the underside of the first planar member 30. Suitably, one or more boosters 48 may be provided as part of an aftermarket system 10 installation. To provide additional space for the scissor lift 45 a pocket may be cut out of the truck bed to provide additional room for the scissor lift 45. If the system 10 is provided at the manufacturing level, a pocket for the scissor lift 45 may be provided as part of the original equipment of the truck 5.

Figure 10A:
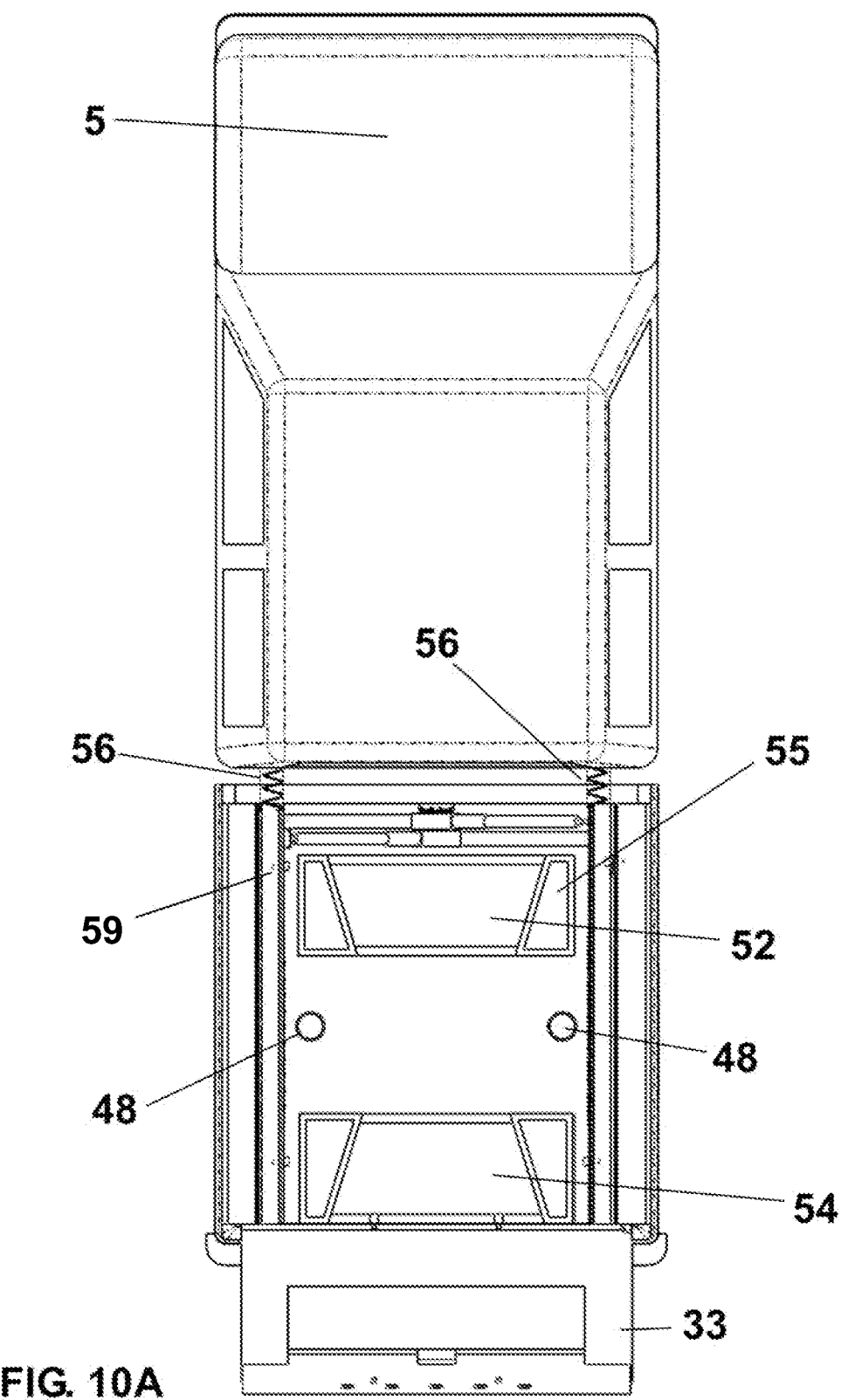
FIG. 10A is a top phantom view of an embodiment of the present conversion system.
Figure 10B:
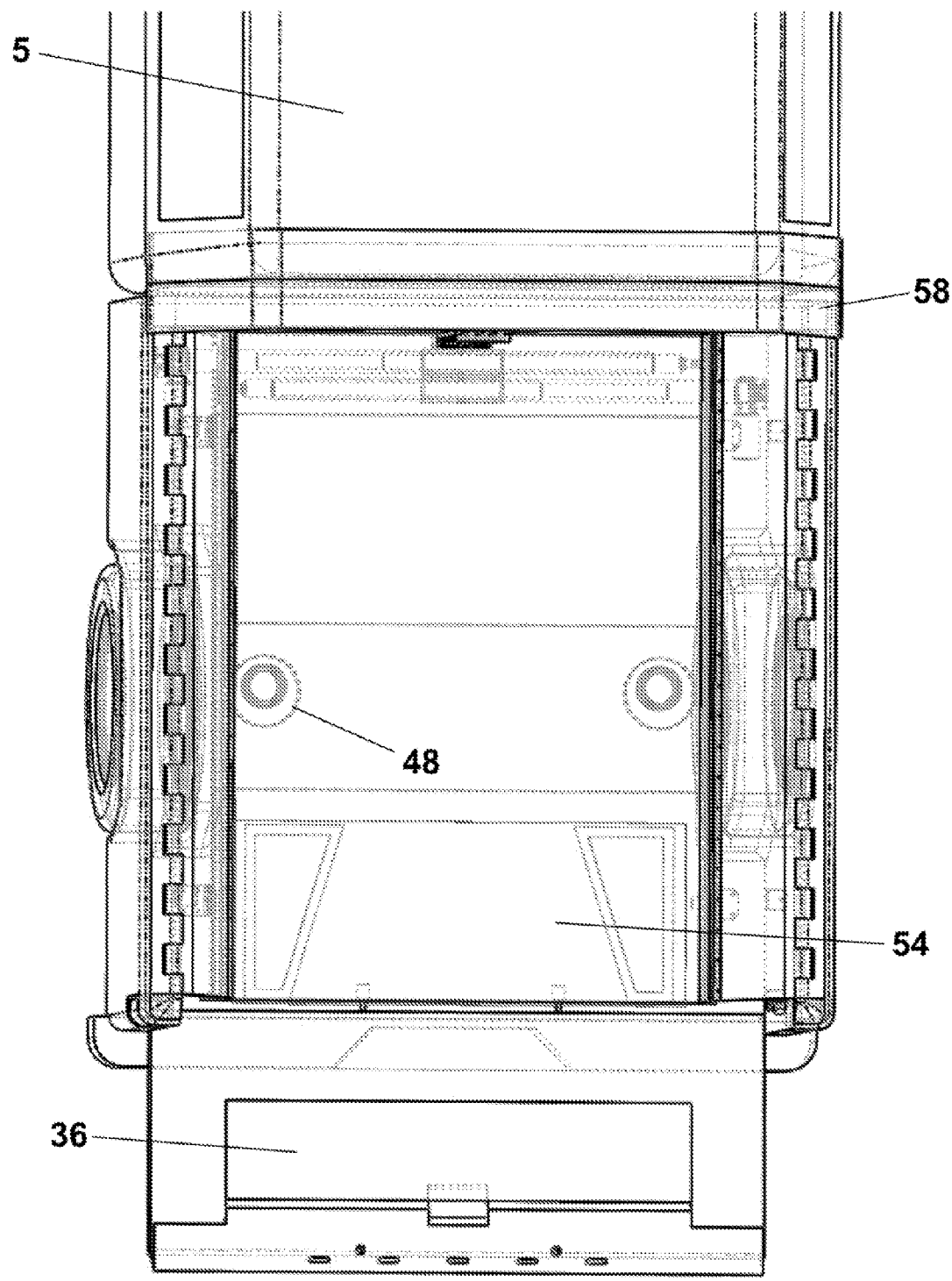
FIG. 10B is a top phantom view of another embodiment of the present conversion system.
Figure 11:
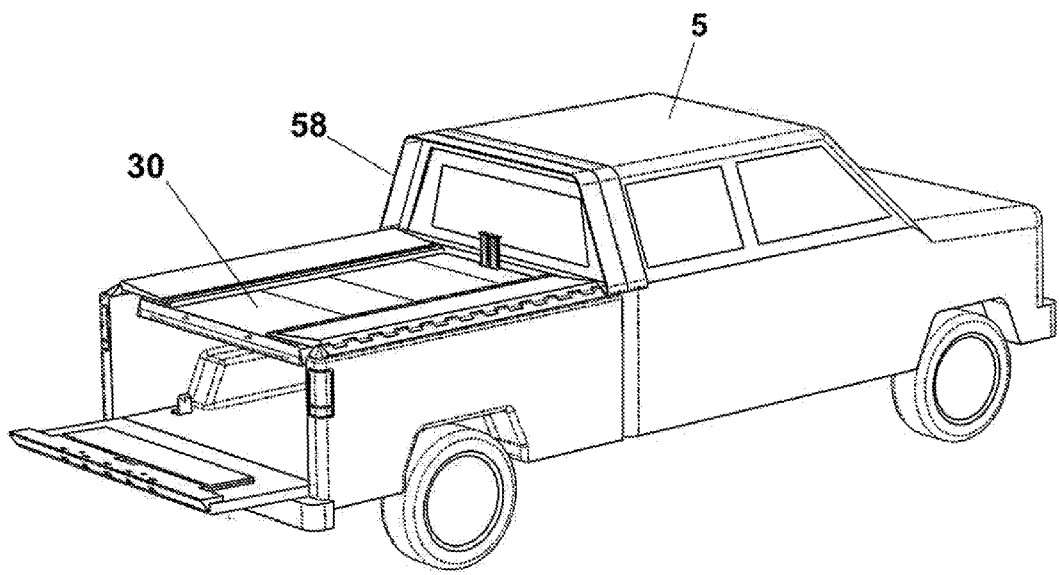
FIG. 11 is a rear perspective view of a truck including an embodiment of a conversion system in a bed cover position.
Figure 12:
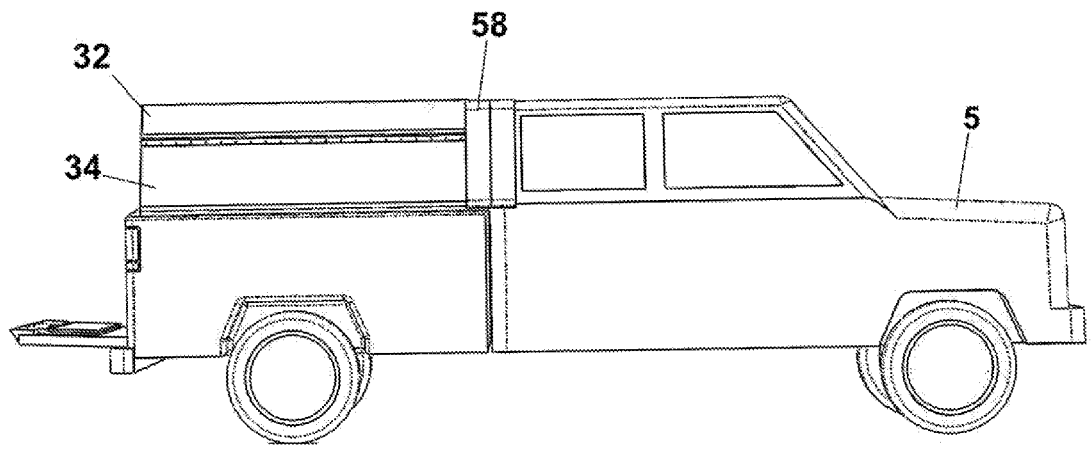
FIG. 12 is a side view of a truck including an embodiment of a conversion system in a camper top position.

Turning to FIG. 10A, in one embodiment the system 10 may include a plurality of foldable windows and panels comprising part of the camper top 16 that are stowable underneath the first planar member 30 when the truck 5 is set to an open bed 12 position. As shown in this embodiment, the system 10 may include a front window with a close off panel 52, a rear window 54 and side windows 55, each of which may fold down to form an enclosure of the camper top 16 as shown in FIG. 3. Also, the system 10 may include one or more accordion bellow interconnection seals 56 operationally configured to seal the rear window of the cab of the truck 5 to the forward adjacent side of the system 10 providing an open area between the system 10 and the truck 5 cab. In this regard, with a truck 5 having a typical sliding back window persons located in the truck bed may converse with persons in the cab of the truck 5. Likewise, persons in the cab of the truck 5 may retrieve items from the bed of the truck 5 without being exposed to the elements, e.g., wind, rain, snow, etc. In another embodiment, as shown in FIGS. 10B, 11 and 12, the system 10 may be devoid of a front window 50 and close off panel 52 and include a cab extension seal 58 operationally configured to engage the first planar member 30, inner panels 32 and outer panels 34 when the system 10 is set at a camper top 16 position thereby forming a seal between the system 10 and the cab of the truck 5.

Figure 13:
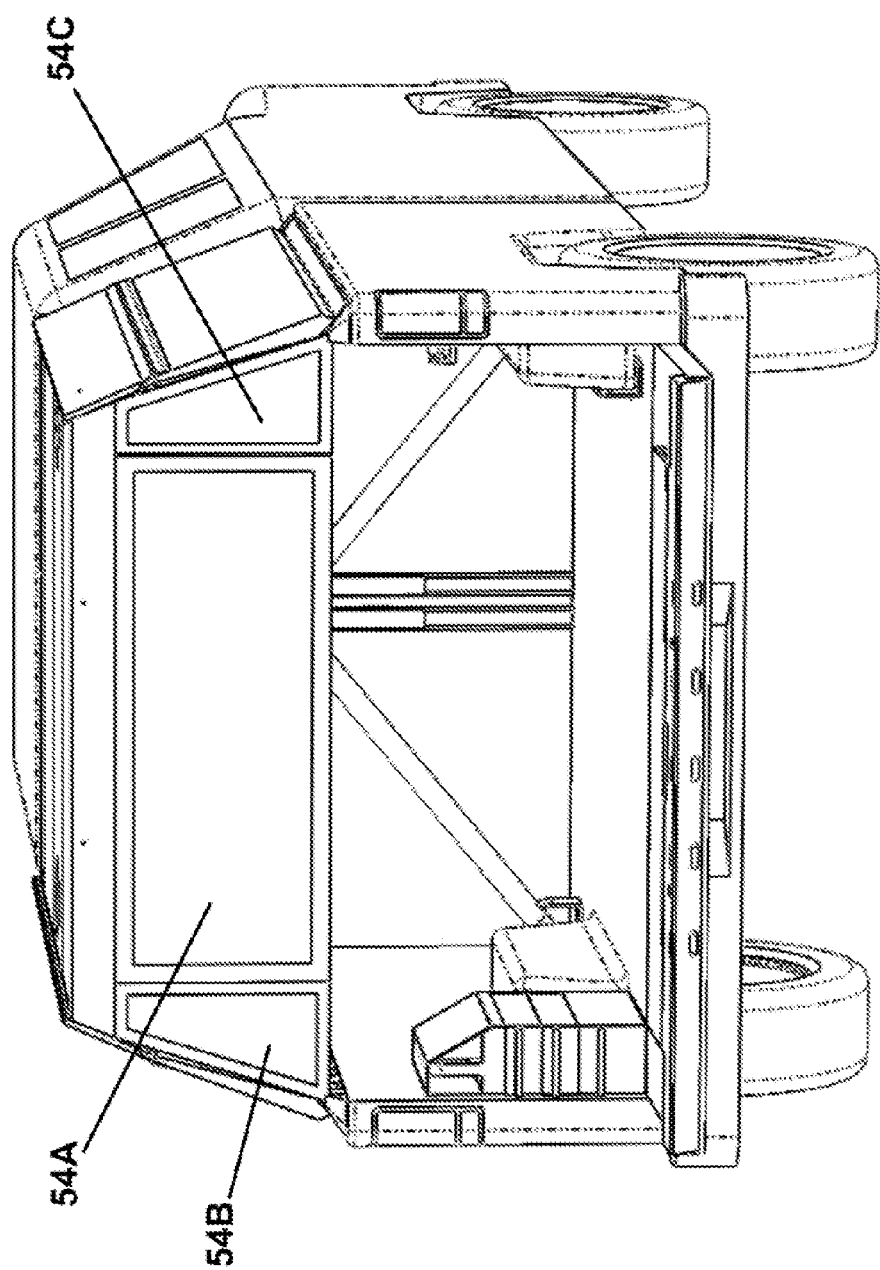
FIG. 13 is a detailed view of a solenoid pin of a locking assembly of an embodiment of a conversion system fixing the first planar member to the outer panels when the conversion system is set to a bed cover position.

In one suitable embodiment, the rear window 54 may include a substantially planar member hingedly attached to the first planar member 30, the inner surface of the first planar member 30 having one or more latches (not shown) for holding the rear window 54 in an open substantially planarly parallel position with the inner surface of the first planar member 30. The rear window 54 may be manually manipulated from an open position to a closed position of a camper top (see FIG. 13) as desired. In one embodiment, the rear window 54 may include multiple planar window members, e.g., a central window member 54A disposed between two smaller outer window members 54B and 54C hingedly attached to the central window member 54A in a manner to fold onto the central window member 54A when raised to an open latched position adjacent the first planar member 30. It is further contemplated that the rear window 54 may be automatically lowered and raised via an actuation system as understood by persons of ordinary skill in the art of power windows, doors and automobile trunks.

Figure 14A:
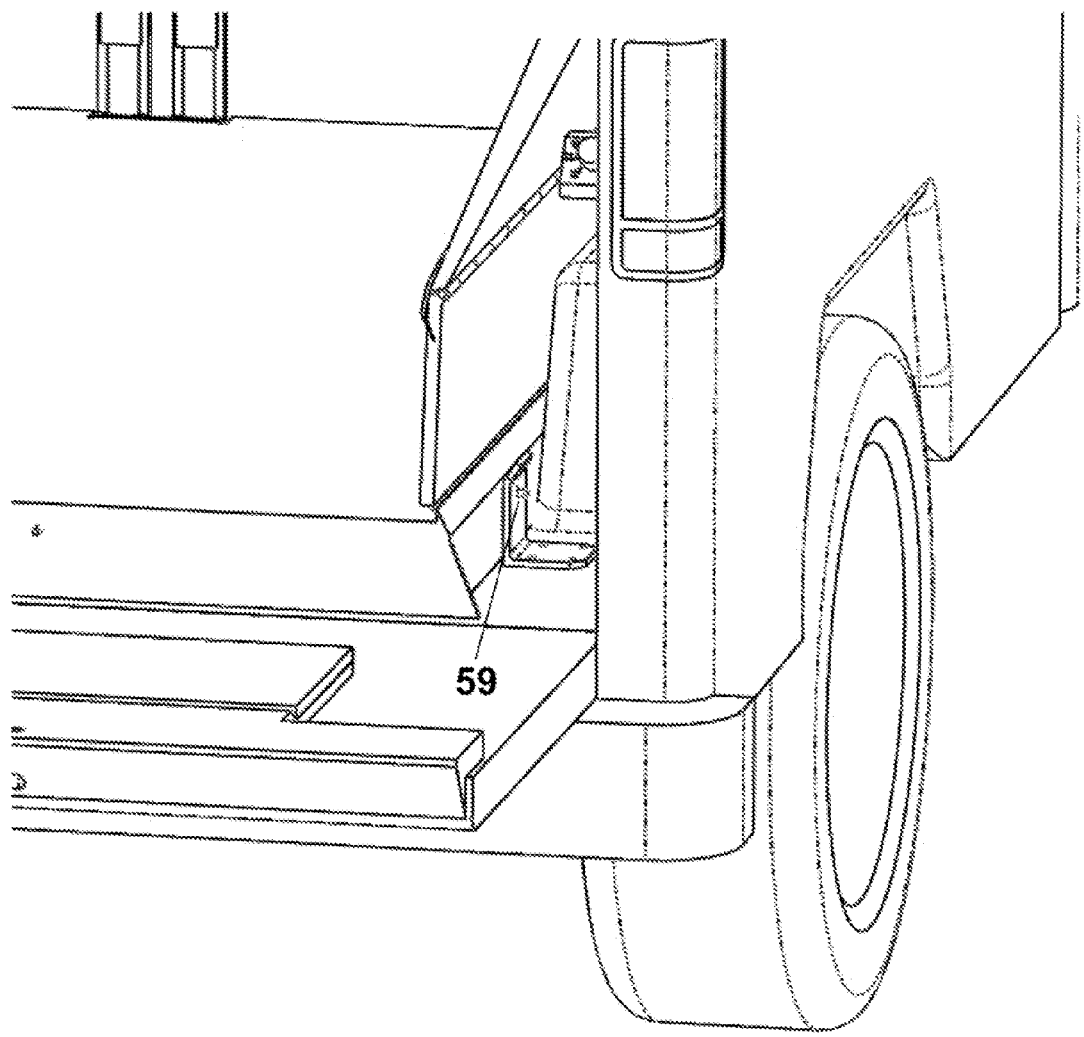
FIG. 14A is a detailed view of a locking assembly locking a first planar member to an outer panels with the conversion system set at an open bed position.

As further shown in FIG. 10A, the system 10 may include a plurality of locking assemblies for fastening the system 10 to a truck bed when the system 10 is in an open bed 12 position. In one embodiment, the locking assemblies may include L-brackets 60 mountable to the bed of the truck at various points as shown in FIG. 12. Suitably, the L-brackets have apertures there through for receiving mechanically/electrical operated pins for securing the system 10 to the truck bed, via the L-brackets, when the system 10 is in an open bed 12 position. Without limiting the invention, one suitable pin may include a 12V dc electrically operated linear solenoid as commercially available from McMaster-Carr, Aurora, Ohio. In another embodiment, one or more of the pins employed may be spring loaded pins. As shown in the simplified embodiment of FIGS. 10A and 14A, the locking assemblies may include a plurality of L-Brackets and corresponding solenoid pins 59.

Figure 14B:
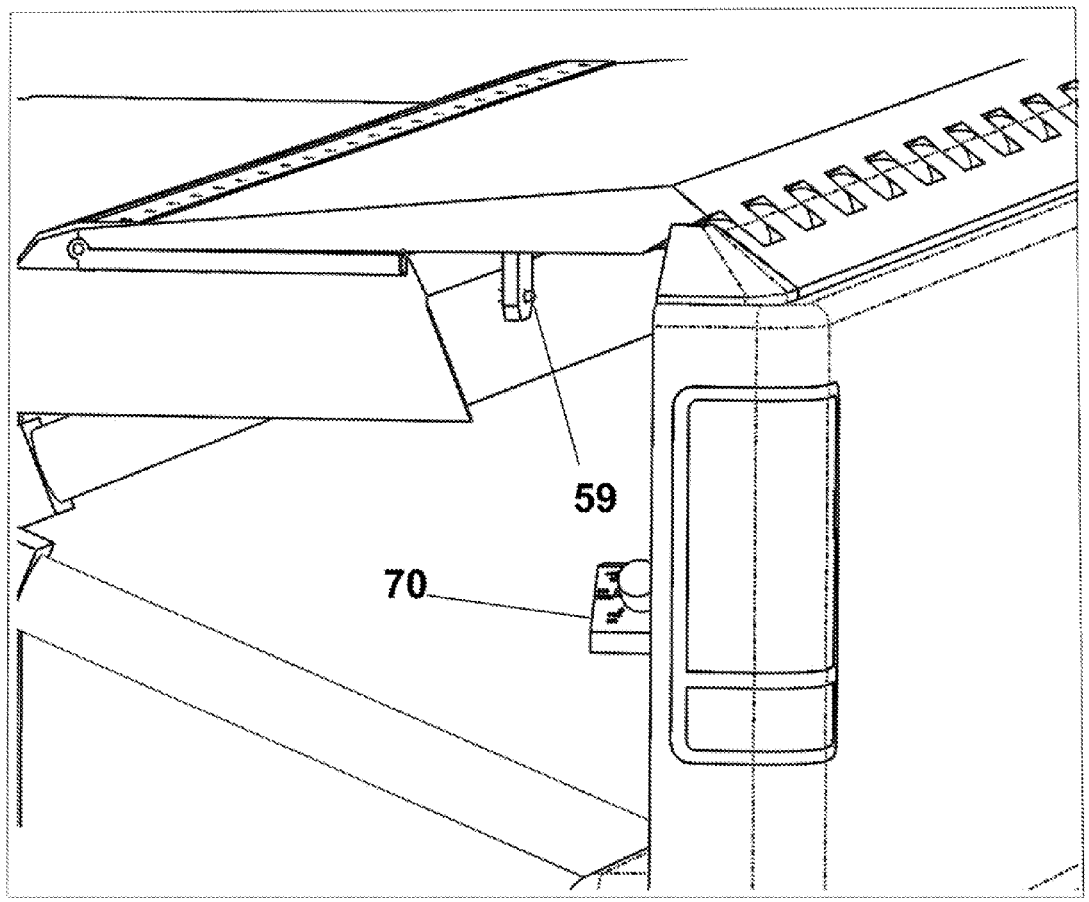
FIG. 14B is a detailed view of a locking assembly locking a first planar member to an outer panels with the conversion system set at a bed cover position.
Figure 19:
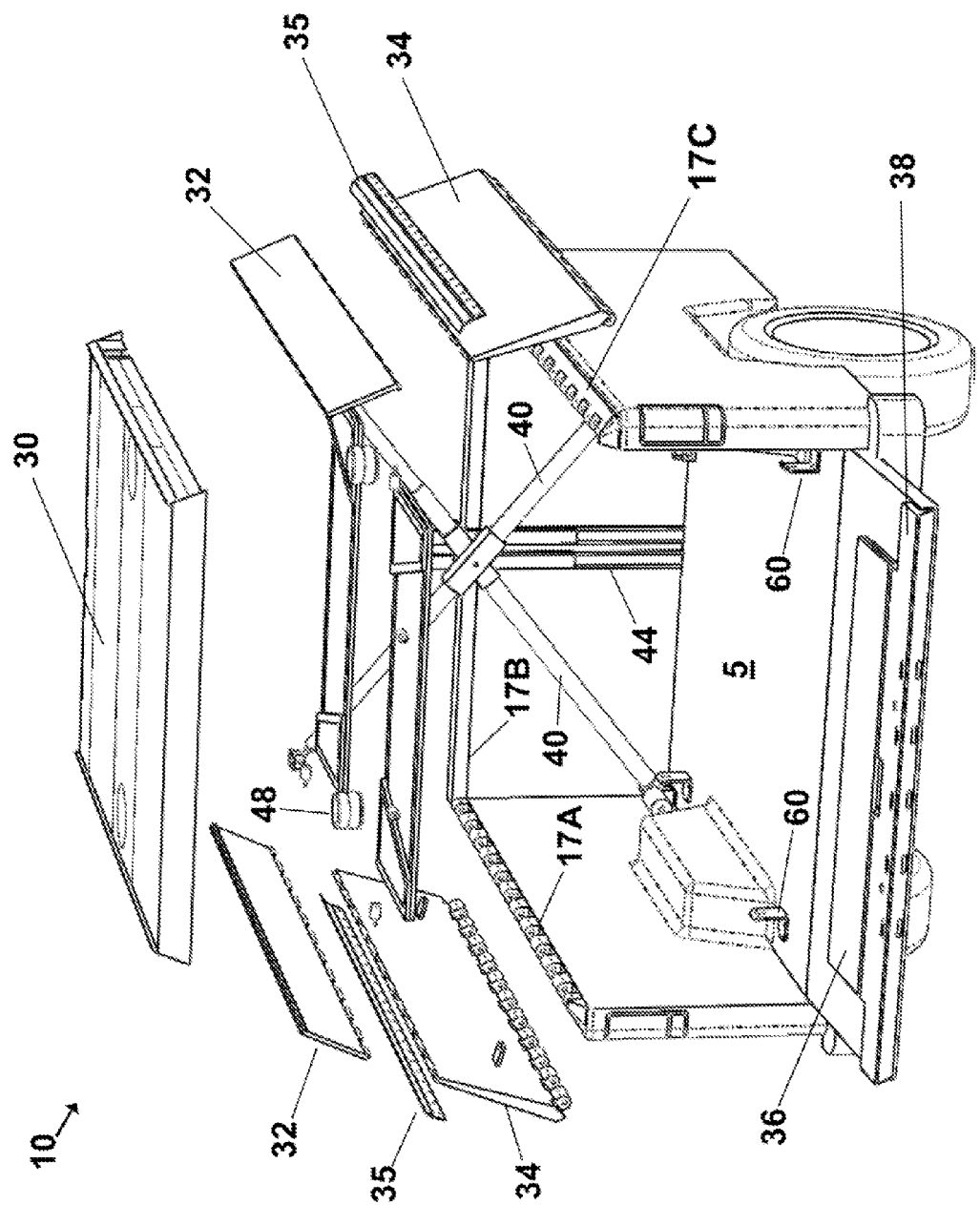
FIG. 19 is an exploded view of a simplified embodiment of a conversion system of this application.
Figure 21:
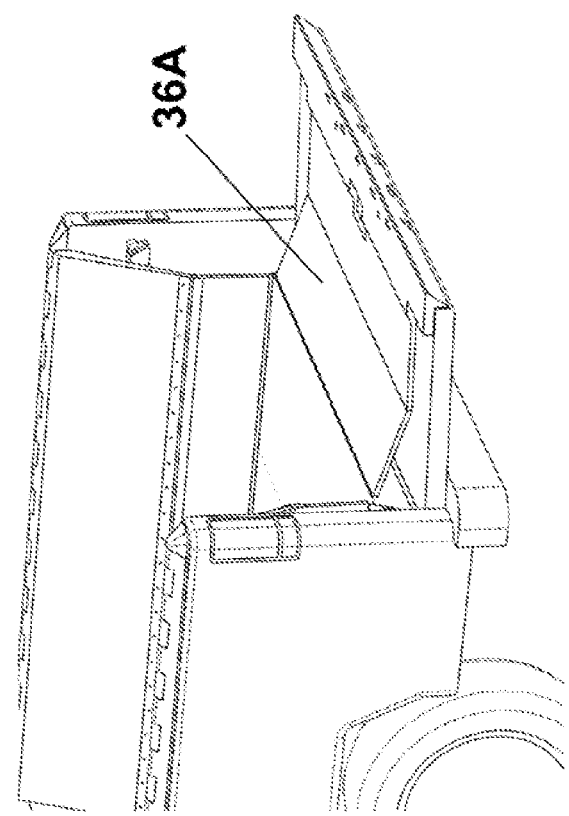
FIG. 21 is another simplified illustration of an integrated folding panel of the present application.

The linear solenoids may also be mated with other bracket apertures for locking the first planar member 30 to the outer panels 34 when the system 10 is set to a bed cover 14 position—see pin 59 in FIG. 14B. As such, the linear solenoids are effective for preventing rattling type noise, damage to system 10 component parts and relative movement. In one example, the solenoid pins 59 described above are further operationally configured to mate with different apertures of the system 10 for securing the inner panels 32 and outer panels 34 together to yield a secure cargo volume within the moving panel members when the system 10 is set at a camper top 16 position. For further reference various above described component parts of an embodiment of the system 10 are depicted in FIG. 19.

Figure 15:
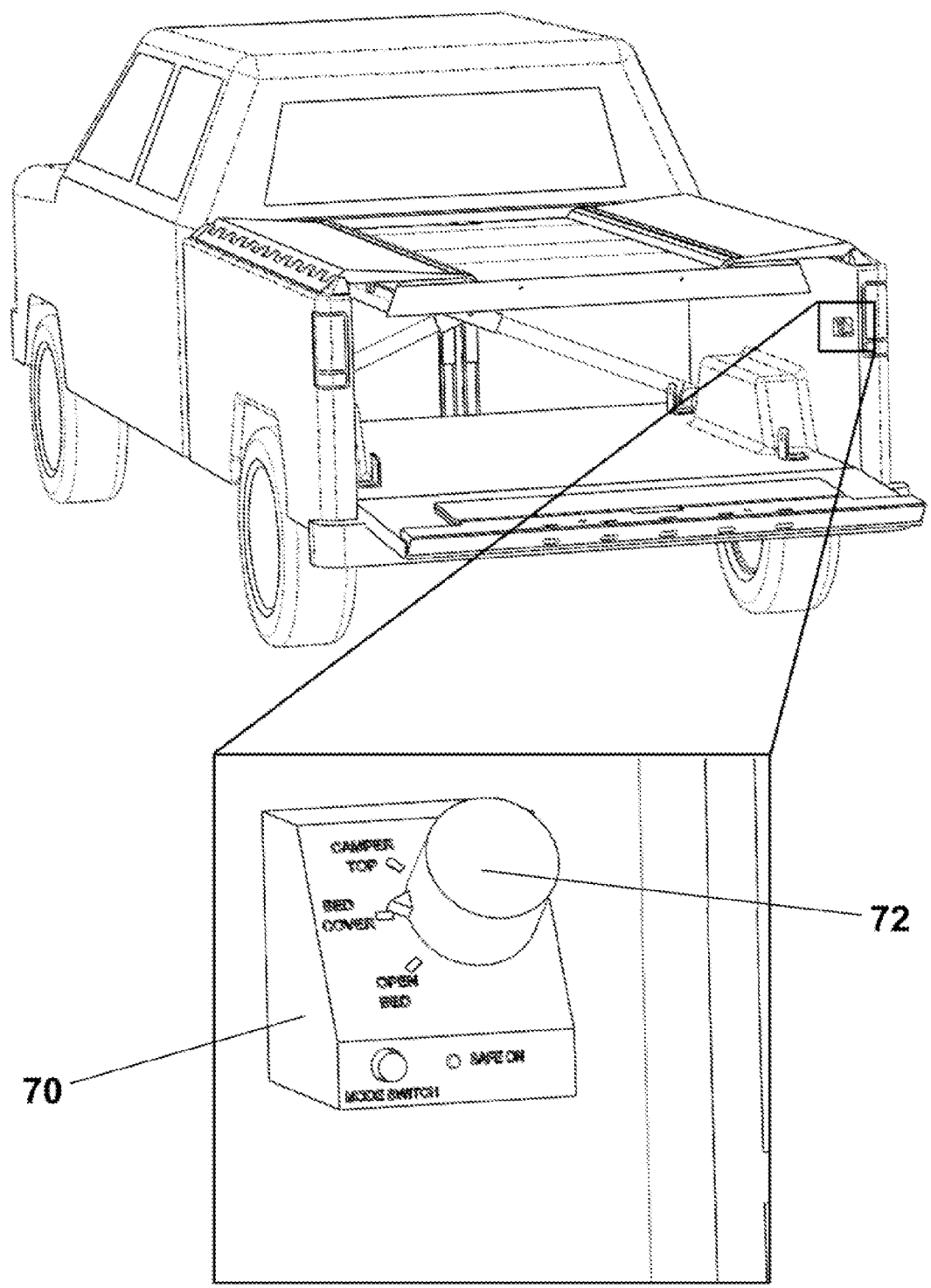
FIG. 15 is a perspective view of a simplified automatic control system of the conversion system.

With attention to FIG. 15, the system 10 may further include an automatic control system for mechanically/electrical transitioning between the three settings described above (FIGS. 1-3). As FIG. 15 illustrates, the automatic control system may include a control box 70 attached to the inner surface of a side wall of a truck bed, under the inner and outer panels 32, 34, for automatically setting the system 10 to one of the three truck 5 styles as shown in FIGS. 1-3. By locating the control box 70 near the rear of the truck bed, a user must lower the tailgate 33 to access the control box 70, which forces a user into a position with his/her torso facing the truck bed during system 10 operation.

As depicted in FIG. 15, the control box 70 may include a switch for changing the system 10 setting. The switch may include a turn knob 72 as shown and/or one or more button controls and/or dials for achieving system 10 conversion operation. It is further contemplated that in another embodiment the automatic control system may include a touch screen rather than a control box 70 as described. Suitably, the control box 70, or touch screen, is connected to circuitry (not shown) for controlling operation of the system 10 preferably via wires or cables as understood by persons of ordinary skill in the art. As shown in FIG. 15, a control box 70 may include a three-position selector switch and/or push button control and/or knob 72 for determining the system 10 setting. In one embodiment, the control box 70 may be mounted to the inner wall of a truck bed as desired. In another embodiment, a recessed area or cavity may be provided in the truck bed side wall for receiving the control box 70 therein, e.g., the control box 70 lying substantially flush with the inner wall of a truck bed thereby protecting the control box 70 from external forces. The automatic control system may also include a second switch such as a safety button 74 disposed along the tailgate 33 and within arms-reach of a person operating the control box 70. The safety switch 74 being designed to ensure two actions for operating the system 10 to avoid inadvertent operation of a single switch.

Suitably, the system 10 may be operated in "Normal" or "Safe" mode as described below. (1) Normal Automatic Mode—the automatic control system may be placed in this mode by inserting a key or by-pass key into the control box 70 as understood by the skilled artisan. Normal automatic mode allows a user to manually turn the three-position selector switch 72 to a desired setting without any further operation. Activation of the safety switch 74, i.e., pressing down on the safety button, at any time following activation of the three-position selector switch 72 services as an automatic real-time system stop interrupting system 10 operation. Activation of the safety switch 74 a second time reactivates the system 10 to resume system 10 action according to the setting of the three-position selector switch 72. (2) Safe Automatic Mode—the automatic control system may be placed in this mode by activating the safety switch 74 to engage the automatic control system using the three-position selector switch 72 to select a desired setting. A user must keep the safety switch 74 activated, e.g., maintaining the safety button in a pressed position, to continue system 10 operation. Deactivation of the safety switch 74, i.e., release of the safety button, will immediately stop the system 10. Reactivation of the safety switch 74 will resume system 10 action according to the setting of the three-position selector switch 72. This setting may be preferable when small children and/or pets are nearby, or where a user often stores items in the truck bed which may have otherwise been forgotten prior to system 10 operation.

The automatic control system may also include a cab mounted control switch and/or a key-ring remote control device and/or one or more video camera systems as desired. One suitable cab mounted control switch is operationally configured for one-way usage, i.e., raising the first planar member 30 from an open cab 12 setting to a camper top 16 setting. One-way operation of a cab mounted control switch is preferred by not mandatory because a system 10 operation located in the cab of a truck 5 may not necessarily be able to see who or what is in the truck bed at time of operation. As understood by the skilled artisan, a suitable key-ring remote control device may include a device similar as known key-ring remote control devices used for car alarms, keyless entry homes and garage door openers. In one suitable embodiment, a video camera system may include a video camera located in the truck cab for transmitting a video signal to one or more video display monitors placed in cab of the truck 5 and within a driver's frame of vision and/or one or more video display monitors in a remote location, such as a person's home or office.

Figure 16:
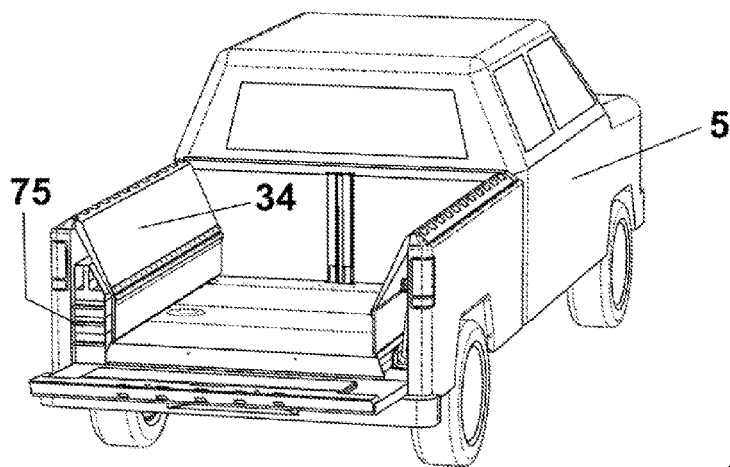
FIG. 16 is a perspective view of a simplified tool box assembly of the conversion system.
Figure 17:
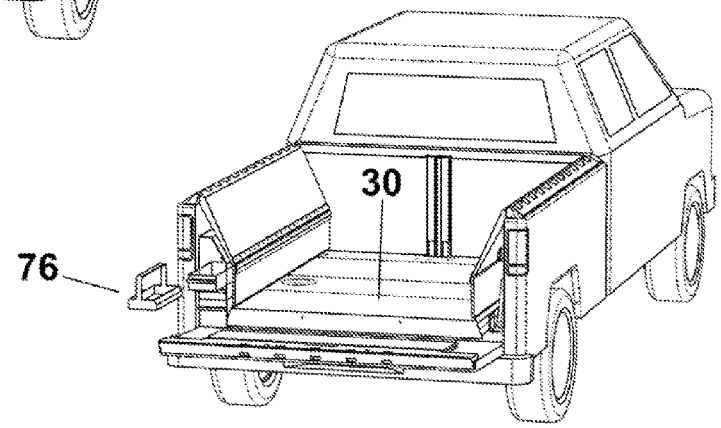
FIG. 17 is another perspective view of a simplified tool box assembly of the conversion system.
Figure 18:
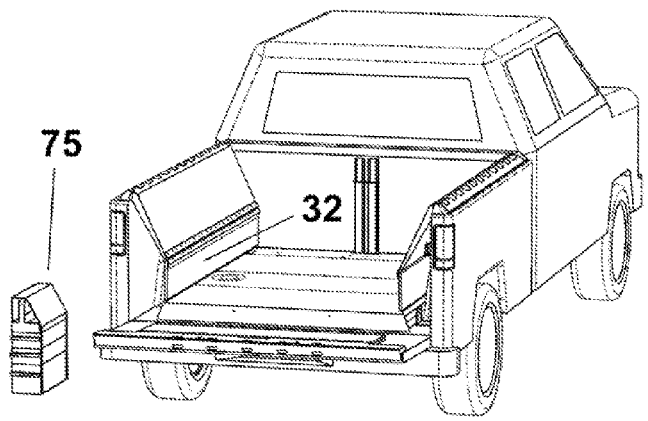
FIG. 18 is another perspective view of a simplified tool box assembly of the conversion system.

Turning to FIGS. 16-18, the system 10 may also include one or more storage areas for tools, food/beverage, hobby and/or recreation articles, and other storable items of choice. For example, the space between the side wall of the truck bed and the inner and outer panels 32, 34 may include one or more containers for housing a tool box or tool box assembly 75. As shown, the space may be maximized by using one or more form fitting containers 75 and may be configured as desired (see pull out drawers 76 in FIG. 17). In addition, any container, box, etc., may be removable and/or portable as desired (see FIG. 18). As such, any container 75 may be provided with casters or wheels. In addition, the inner panel 32 and outer panel 34 may include a latch for securing the container 75 in the designated storage area. A suitable latch includes, but is not necessarily limited to a manual quick release latch.

The space between the side wall of the truck bed and the inner and outer panels 32, 34 may also include a food and/or beverages unit including one or more of a cooler and/or ice chest and/or refrigerator and/or freezer as desired—hereafter collectively referred to a "refrigerator." In one particular embodiment, a refrigerator may take the place of one of the component parts or drawers 76 of the tool box assembly 75. In addition, it is further contemplated that the space between the side wall of the truck bed and the inner and outer panels 32, 34 may also be used to store power sources, e.g., batteries, light sources, firearms, and combinations thereof, as desired.

In another embodiment, the system 10 may include one or more seating members attached to the bed of a truck 5 that are operationally configured to open for seating purposes as the system 10 is converted to a camper top 16 position. As the system 10 converts from a camper top 16 to a bed cover 14 and/or an open bed 12 setting, the system 10 is operationally configured to close the one or more seating members back against the bed of the truck 5.

The invention will be better understood with reference to the following non-limiting example, which is illustrative only and not intended to limit the present invention to a particular embodiment.

EXAMPLE 1

In a first non-limiting example, a system 10 is provided for use with a truck 5 having a 152.4 cm (60.0 inch) truck bed width ("W") as understood by persons of ordinary skill in the art of trucks. Suitably, the first planar member 30 ("$L_3$")has a uniform thickness of about 8.89 cm (3.5 inches); the inner panels 32 ("$L_2$") have a uniform thickness of about 1.27 cm (0.5 inches); the outer panels 34 ("$L_1$") have a uniform thickness of about 1.27 cm (0.5 inches)—where the dimensions are determined according to the formula:

$$W=L_3+2L_1-2L_2.$$

Persons of ordinary skill in the art will recognize that many modifications may be made and equivalence may be substituted for elements discussed herein without departing from the spirit and scope of the system and method. The embodiment(s) described herein are meant to be illustrative only and should not be taken as limiting the invention, which is defined in the claims. No claim element herein is to be construed under the provisions of 35 U.S.C. 112(f) or pre-AIA 35 U.S.C. 112, sixth paragraph, unless the element is expressly recited using the phrase "means for."

I claim:

1. A cargo area conversion assembly including a plurality of planar members foldably attached together and to the walls of a cargo area, the planar members being operationally configured to act as the floor and side walls of the cargo area in a first position, act as a horizontal cover of the cargo area in a second position, and act as the roof and perimeter side walls of a camper top above the side walls of the cargo area in a third position.

2. The cargo area conversion assembly further including an actuator for directing the assembly between the first, second and third positions.

3. The cargo area conversion assembly of claim 2 wherein the actuator includes an intercrossing linear actuator assembly.

4. The cargo area conversion assembly of claim 2 wherein the actuator includes a scissor lift.

5. The cargo area conversion assembly of claim 1 further including a storage container attached to one or more of the planar members.

6. The cargo area conversion assembly of claim 1 further including an automatic control system for mechanically/electrical transitioning between the first, second and third positions.

7. A conversion system for a truck bed including:
a plurality of planar members foldably attached together and to the bed of the truck, including a first planar member operationally configured to operate as a truck bed surface in a first position, a truck bed cover in a second position, and as a camper top roof in a third position;
an actuation system operationally configured to direct the first planar member between the first, second and third positions; and
an automatic control system in electrical communication with the actuation system, the automatic control system being operationally configured to direct the system between the first, second and third positions.

8. The conversion system of claim 7 further including sealing members operationally configured to fluidly seal the perimeter of the truck bed.

9. A method of converting an open bed cargo area to a cargo area that is convertible between an open bed setting and a camper top setting, including:
installing in the open bed cargo area (A) a cargo area conversion system including (1) a plurality of planar members foldably attached together and operationally configured to be attached to the walls of a cargo area, the planar members being operationally configured to act as the floor and side walls of the cargo area in a first position, act as a horizontal cover of the cargo area in a second position, and act as the roof and perimeter side walls of a camper top above the side walls of the cargo area in a third position; (B) an actuation system in communication with the cargo area and the cargo area conversion system; and (C) an automatic control system in electrical communication with the actuation system.

* * * * *